United States Patent
Boggan

(10) Patent No.: US 9,385,891 B2
(45) Date of Patent: Jul. 5, 2016

(54) GALVANIC ISOLATION INTERFACE FOR HIGH-SPEED DATA LINK FOR SPACECRAFT ELECTRONICS, AND METHOD OF USING SAME

(71) Applicant: The Aerospace Corporation, El Segundo, CA (US)

(72) Inventor: Garry H. Boggan, League City, TX (US)

(73) Assignee: The Aerospace Corporation, El Segundo, CA (US)

( * ) Notice: Subject to any disclaimer, the term of this patent is extended or adjusted under 35 U.S.C. 154(b) by 0 days.

(21) Appl. No.: 14/825,586

(22) Filed: Aug. 13, 2015

(65) Prior Publication Data

US 2016/0013953 A1    Jan. 14, 2016

Related U.S. Application Data

(63) Continuation of application No. 13/606,841, filed on Sep. 7, 2012, now Pat. No. 9,143,366.

(51) Int. Cl.
*H01P 5/00* (2006.01)
*H04L 25/02* (2006.01)
*H01P 3/08* (2006.01)
*H03H 2/00* (2006.01)

(52) U.S. Cl.
CPC ............ *H04L 25/0266* (2013.01); *H01P 3/081* (2013.01); *Y10T 29/49117* (2015.01)

(58) Field of Classification Search
CPC .................................. H01P 5/00; H03H 2/00
USPC ........ 333/24 R, 26, 100, 109, 110, 116–118, 333/245–247; 330/124 R
See application file for complete search history.

(56) References Cited

U.S. PATENT DOCUMENTS

| | | | | |
|---|---|---|---|---|
| 5,606,283 A | * | 2/1997 | Allen | H01P 1/15 330/124 R |
| 2002/0025786 A1 | * | 2/2002 | Brady | G05F 1/565 455/78 |
| 2009/0015323 A1 | * | 1/2009 | Wyse | H03F 1/52 330/124 R |
| 2011/0187585 A1 | * | 8/2011 | Floyd | G01S 13/00 342/179 |

* cited by examiner

*Primary Examiner* — Dean Takaoka
(74) *Attorney, Agent, or Firm* — Jones Day; Jaime D. Choi

(57) ABSTRACT

Under one aspect of the present invention, a structure for providing galvanically isolated communication between first and second spacecraft electronic components includes a semi-insulating substrate; an input port disposed on the substrate and configured to receive a signal from the first spacecraft electronic component; a coupling structure disposed on the substrate, coupled to the input port so as to receive the signal, and configured to provide an isolated replica of the received signal as an output; a signal conditioner disposed on the substrate, coupled to the coupling structure so as to receive the isolated replica of the received signal, and configured to condition the isolated replica; and an output port disposed on the substrate, coupled to the signal conditioner so as to receive the conditioned isolated replica, and configured to provide the conditioned isolated replica to the second spacecraft electronic component.

30 Claims, 14 Drawing Sheets

GALVANIC ISOLATION INTERFACE FOR HIGH-SPEED DATA LINK FOR SPACECRAFT ELECTRONICS, AND METHOD OF USING SAME

CROSS-REFERENCE TO RELATED APPLICATION

This application is a continuation under 35 U.S.C. §120 of U.S. patent application Ser. No. 13/606,841, filed on Sep. 7, 2012 and entitled "Galvanic Isolation Interface for High-Speed Data Link for Spacecraft Electronics, and Method of Using Same," the entire contents of which are incorporated by reference herein.

FIELD OF INVENTION

This application generally relates to electronic components for galvanically isolating high-speed data links, particularly links between spacecraft electronic components, and methods of using the same.

BACKGROUND

To be suitable for use in harsh environments, such as space or manufacturing, electronics must be particularly robust, reliable, and have a reduced susceptibility to electromagnetic interference, while at the same time providing a satisfactory rate of data throughput for the application. Additionally, it may be desirable to galvanically isolate electronic components from one another in such environments, so as enhance operational stability of the components by reducing the likelihood that operational parameters or malfunction of one component will interfere with the functioning of another. As is known in the art, "galvanic isolation" between electronic components means that although information may pass between the components, charge-carrying particles do not. Galvanic isolation is particularly useful in situations where the electronic components have different ground potentials, because transfer of charge-carrying particles from one component to another may change the ground potential of one or both components, thus disturbing the operation of one or both components.

For example, electronic components on spacecraft, e.g., space vehicles and satellites, may be configured so as to comply with the SpaceWire (ECSS-E-ST-50-12C) and/or SpaceFibre standards. The SpaceWire and SpaceFibre standards are both incorporated by reference in their entireties herein. SpaceWire is a standard developed by the European Space Agency (ESA) intended to ease the interconnection of various electronic components in spacecraft, and provides for data rates between 2 and 200 Mbits/second. SpaceFibre is an extension of SpaceWire that is also being developed by the ESA, and provides for even higher data rates, e.g., of up to 6 Gbits/second or higher. Neither standard requires that electronic components be galvanically isolated from one another, although both standards permit galvanic isolation. Instead, the SpaceWire and SpaceFibre standards define a physical layer in which low voltage differential signaling (LVDS) techniques use copper media to transmit signals from one line replaceable unit (LRU) on the spacecraft to another. Each LRU may implement physical schemes that are configured to provide LVDS signaling interconnectivity with another LRU, and an electronic element such as a field-programmable gate array (FPGA) that is configured to provide one or more functionalities implementing signal conditioning compatible with SpaceWire and/or SpaceFibre signaling standards, as well as other data generating functions supporting an imager or a sensor. The SpaceWire and SpaceFibre standards require the LVDS signaling scheme between the LRUs comply with the ANSI/TIA/EIA-644 standard, the entire contents of which are incorporated by reference. The LVDS signaling protocol implements differential signaling techniques including that the balanced differential lines have tightly coupled equal but polar opposite signals which reduce EMI. Specifically, at some lower data rate implementations, the magnetic fields radiated by each of the lines are drawn toward each other, causing cancellation of much of the magnetic fields. [AN-5017 LVDS Fundamentals, Fairchild Semiconductor, June 2005]. While single ended, galvanically isolated, interconnects are also attractive, many applications choose to use LVDS which require a pair of differential signals, i.e., a positive going signal and a negative going signal which are inverse mirror images, to gain signal integrity.

However, merely coupling the LRUs with metallic cabling or other non-isolating interface conforming to the LVDS signaling protocol may not sufficiently isolate the LRUs from one another. As such, if the LRUs operate at different grounds from one another, charge-carrying particles may move from one LRU to another via the interface, modifying one or both grounds and thus potentially disrupting proper functioning of one or both LRUs. Or, for example, power supply failure of one of the LRUs may propagate to the other LRU via the interface, which may cause over-voltage emission. Or, for example, immersion of the spacecraft within a plasma while in orbit may cause voltage buildup internally and/or externally, which buildup may discharge to an LRU and propagate via the interface to another LRU, disrupting the operation of both LRUs. Or, for example, electrical transients induced by lightning in electrical circuits due to coupling of electrical fields, e.g., for launcher applications, also may propagate from one LRU to another, disrupting the operation of both LRUs. Furthermore, within a given LRU, any non-galvanic coupling between the internal components of that LRU may render each of the components susceptible to similar disruption.

Some methods that have been considered for mitigating the effects of electromagnetic interference (EMI) in spacecraft include providing a controlled grounding scheme throughout the spacecraft, as well as controlling the local ground level in printed circuit boards (PCBs) and in LRUs. Additionally, it has been considered to use power converters with over voltage protection, so that if a power supply of one LRU fails, the failure does not propagate to a connected LRU. Or, for example, the spacecraft itself may be designed as a "Faraday cage," may have surfaces designed to inhibit or control electrical discharge, may have enclosed electronic boxes, and/or may use shielded cables as well as over-shielding on cable bundles. Nonetheless, despite such safeguards, any non-galvanically isolated coupling between electronic components of the spacecraft, e.g., direct coupling between or within LRUs, may allow the transfer of charged particles from one component to another, thus potentially disrupting operation.

Although galvanic isolation interfaces have been known for some time, previously developed galvanic isolation interfaces may have reduced reliability in harsh environments, may have relatively limited data throughput rates, and/or may be incompatible with SpaceWire or SpaceFibre standards. For example, it has been proposed to use transformer-based or capacitance-based galvanic isolators, or opto-couplers, with SpaceWire links. However, the data throughput rate provided by transformer-based galvanic isolation may be insufficient to meet SpaceWire and/or SpaceFibre standards. Capacitance-based galvanic isolators may support sufficient data throughput rates, but may have reduced reliability if exposed to high electromagnetic interference. Opto-couplers may also support sufficiently high data throughput rates, but may degrade over time and may be susceptible to radiation.

U.S. Pat. No. 8,064,872 to Dupuis discloses an integrated circuit having radiofrequency (RF) isolation circuitry located in metal layers on a silicon substrate. The usefulness of such an integrated circuit in a spacecraft may be limited by eddy currents that may develop in the silicon substrate if the circuit is exposed to electromagnetic interference such as may arise in orbit.

U.S. Pat. No. 5,105,171 to Wen et al. discloses a coplanar waveguide directional coupler formed on a surface of a substrate and/or a microwave monolithic integrated circuit (MMIC) chip that is flip-chip mounted on the substrate and coupled thereto by conductive bumps. Wen discloses that the coupler may be used as part of a Doppler radar transceiver. Wen is silent on configuring the coupler so as to make it suitable for use in interconnecting spacecraft electronic components in a galvanically isolated manner.

U.S. Pat. No. 6,895,224 to Munday et al. discloses a low noise amplifier (LNA) that includes a Lange coupler that receives a signal and splits the signal into two symmetric signals that are then fed into a separate amplification section of the LNA. Munday is silent on configuring the LNA so as to make it suitable for use in interconnecting spacecraft electronic components in a galvanically isolated manner.

Accordingly, there is a need to provide a galvanic isolation interface solution suitable for use in providing signals between electronic components on a spacecraft especially for implementing high data rates needed for applications/functionality within LRUs.

SUMMARY OF INVENTION

Embodiments of the present invention provide galvanic isolation interfaces for high-speed data links for spacecraft electronics, and methods of using the same. The interfaces are based on semi-insulating substrates, such as but not limited to gallium arsenide, which are relatively unsusceptible to eddy currents caused by electromagnetic interference, as compared to semiconducting substrates such as silicon. The interfaces also include coupling structures configured to provide data throughputs having sufficiently high rates to comply with the SpaceWire and/or SpaceFibre standards, e.g., at least 200 Mbit/second, or at least 2 Gbit/second, or at least 20 Gbit/second, or even at least 200 Gbit/second.

Specifically, each coupling structure may include a metallic Lange coupler that is disposed on the substrate, is lithographically defined, and is configured to receive a signal from a first space electronic component and to provide an isolated replica of that signal to a second space electronic component. The coupling structure optionally may include signal conditioning circuitry, e.g., a monolithic microwave integrated circuit (MMIC) such as an amplifier, that is also disposed on the substrate and lithographically defined, and is configured to receive the isolated replica of the signal from the Lange coupler. The MMIC may amplify or otherwise condition the isolated replica and provide the resulting signal to the second space electronic component, optionally via a metallic microstrip that is also lithographically defined on the substrate. Because the coupling structure is lithographically defined, the sizes of the various features therein may be well controlled, leading to enhanced phase stability of the signal as it passes through the structure that is substantially repeatable between production wafer fabrication lots. Additionally, the input and output impedances of the coupling structure readily may be tailored so as to provide enhanced throughput and integrity of signal to the electronic components that the structure couples together. The metallic features of the coupling structure are readily compatible with the SpaceWire and SpaceFibre standards, provide sufficiently high data throughput rates, and have enhanced reliability and resistance to electromagnetic interference or radiation as compared, for example, to capacitive galvanic isolation interfaces or to opto-couplers.

Under one aspect of the present invention, a structure for providing isolated communication between first and second electronic components includes a semi-insulating substrate; a first input port disposed on the substrate and configured to receive a signal from the first electronic component; a first coupling structure disposed on the substrate, coupled to the first input port so as to receive the signal from the first input port, and configured to provide an isolated replica of the received signal as an output; a first signal conditioner disposed on the substrate, coupled to the first coupling structure so as to receive the isolated replica of the received signal from the first coupling structure, and configured to output a conditioned isolated replica of that signal; a first microstrip element disposed on the substrate, coupled to the first signal conditioner so as to receive the conditioned isolated replica from the first signal conditioner, and configured to output the conditioned isolated replica with stable phase characteristics, optionally also transforming the impedance of the replica to improve signal integrity; and a first output port disposed on the substrate, coupled to the first microstrip element so as to receive the conditioned isolated replica from the first microstrip element, and configured to provide the conditioned isolated replica to the second electronic component.

In some embodiments, such as differential signaling applications, the signal comprises a pair of first and second signals that are substantially inverses of one another, the first input port comprises first and second input pads respectively configured to receive the first and second signals; the first coupling structure comprises first and second Lange couplers respectively coupled to the first and second input pads so as to receive the first and second signals from the first or second input pad and each configured to respectively provide an isolated replica of the first or second signal as an output; the first signal conditioner comprises first and second monolithic microwave integrated circuit (MMIC) amplifiers respectively coupled to the first and second Lange couplers so as to respectively receive the isolated replica of the first or second signal from the first or second Lange coupler, and respectively configured to amplify the isolated replica; the first microstrip element comprises first and second microstrips respectively configured to receive the isolated conditioned signals from the first or second MMIC amplifier and to respectively output the isolated amplified replica of the first or second signal, the phase characteristics of the amplified replicas of the first and second signals being stable relative to one another; and the first output port comprises first and second output pads respectively coupled to the first and second microstrips, and respectively configured to provide the first and second amplified isolated replicas to the second electronic component.

The first and second electronic components may each independently include an electronic processing component such as a field-programmable gate array (FPGA), other complex programmable logic device (CPLD), a computer processing unit (CPU), a digital signal processor (DSP), or micro-controller unit (MCU).

Some embodiments further include third and fourth input ports disposed on the substrate and configured to receive signals from the second electronic component; third and fourth coupling structures disposed on the substrate, respectively coupled to the third and fourth input port so as to respectively receive the signals, and configured to provide isolated replicas of those signals as output; third and fourth signal conditioners disposed on the substrate, respectively coupled to the third and fourth coupling structures so as to respectively receive the isolated signal replicas, and configured to respectively provide conditioned isolated replicas as output; and third and fourth output ports disposed on the substrate, respectively coupled to the third and fourth signal conditioners so as to receive the conditioned isolated replicas, and configured to provide the conditioned isolated replicas to the first electronic component. The third and fourth input ports each may include a pair of input pads, the third and fourth coupling structures each may include a pair of Lange couplers, the third and fourth signal conditioners each may include a pair of monolithic microwave integrated circuit (MMIC) amplifiers, and the third and fourth output ports each may include a pair of output pads. In some embodiments, the respective signals from the first and second electronic components each may comply with an element of SpaceWire or SpaceFibre signal protocol, and the conditioned isolated replicas respectively provided to the first and second electronic component each may comply with an element of the SpaceWire or SpaceFibre signal protocol.

In some embodiments, the structure still further includes additional input ports disposed on the substrate and configured to receive a strobe signal pair from the first electronic component, the strobe signal pair complying with the SpaceWire or SpaceFibre signal protocol; additional coupling structures disposed on the substrate, coupled to the additional input ports so as to receive the strobe signal pair, and configured to provide an isolated replica of the strobe signal pair as output signals; additional signal conditioners disposed on the substrate, coupled to the additional coupling structures so as to receive the isolated replicas of the strobe signal pair, and configured to condition the isolated replicas; and additional output ports disposed on the substrate, coupled to the additional signal conditioners so as to receive the conditioned isolated replicas, and configured to provide the conditioned isolated replicas to the second electronic component.

In some embodiments, the semi-insulating substrate comprises a material selected from the group consisting of: gallium arsenide (GaAs), gallium nitride (GaN), silicon carbide (SiC), silicon-on-sapphire (SOS), and silicon-on-insulator (SOI). The input and output ports and the coupling structure may be lithographically defined and may comprise a metal. Preferably, the coupling structure is configured to transfer the signal from the first input port to the first signal conditioner without forming an electrical path.

In some embodiments, the frequency of operation may be adjusted by suitably selecting the dimensions of the coupling structure(s) and signal conditioner(s) so as to be compatible with desired frequencies, e.g., so as to accommodate desired data rates while providing galvanic isolation beyond the existing or potential SpaceWire or SpaceFibre standard.

Under another aspect of the present invention, a method for providing galvanically isolated communication between first and second electronic components may include receiving at a first input port disposed on a semi-insulating substrate in the second electronic component a signal from the first electronic component; at a first coupling structure disposed on the substrate, receiving the signal from the first input port and providing as output an isolated replica of the received signal; at a first signal conditioner disposed on the substrate, receiving the isolated replica from the first coupling structure, conditioning the isolated replica, and providing as output a conditioned isolated replica; and at a first output port disposed on the substrate, receiving the conditioned isolated replica from the first amplifier structure and providing as output the conditioned isolated replica to the second electronic component.

DETAILED DESCRIPTION

Embodiments of the present invention provide high-speed galvanic isolation interfaces between electronic components in harsh environments, such as on a spacecraft, where such components may be particularly susceptible to electromagnetic interference and/or electrostatic discharge. The galvanic isolation interfaces suitably may be used to provide a signal from one electronic component to another, while inhibiting the transfer of charged particles between the components. The galvanic isolation interfaces are based on the use of isolation structures, such as Lange couplers, that are metallic, are lithographically defined, and are disposed on a semi-insulating substrate. The isolation structures may receive a signal, or signal pair, from a first electronic component on the spacecraft and pass a replica of the signal to a second electronic component on the spacecraft, while galvanically isolating the two components from one another. The lithographic nature of the isolation structure may provide for high manufacturing reproducibility and well-established phase relationships between complementary signals traveling through isolation interfaces, while the use of a semi-insulating substrate may inhibit the formation of eddy currents that otherwise may detrimentally impact the interface's performance. The isolation structures may be combined with signal conditioning circuitry, such as monolithic microwave integrated circuits (MMICs), that is also disposed on the substrate and that may amplify or provide other suitable processing on the signals before providing the signals to the second electronic component, e.g., via a metallic, lithographically defined microstrip line that is also disposed on the substrate that routes to a pin and thence into a printed wiring board for processing by other electronic circuitry such as an FPGA. Preferably, each isolation interface component is configured to provide a high data throughput, e.g., 200 Mbit/second or greater, or 2 Gbit/second or greater, or 20 Gbit/second or greater, or 200 Gbit/second or greater.

First, a high-level overview will be provided of an exemplary spacecraft electronic system that includes electronic components coupled by galvanic isolation interfaces of the present invention. Then, various embodiments of galvanic isolation interfaces, including embodiments compatible with the SpaceWire or SpaceFibre standards, will be described. Lastly, an exemplary method of using the galvanic isolation interfaces of the present invention to transmit signals between spacecraft electronic components will be described.

Figure 1:
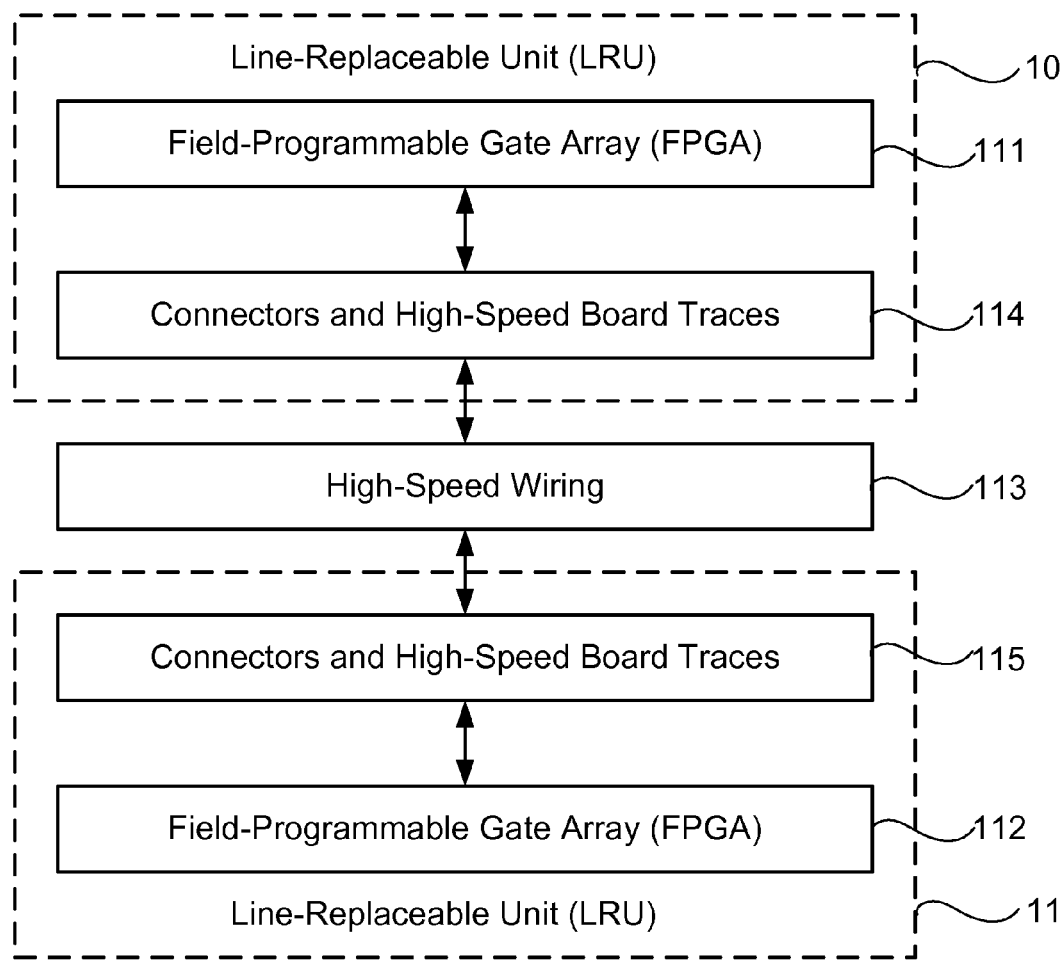
FIG. 1 illustrates a high-level block diagram of spacecraft electronic components that are coupled using prior art high-speed wiring to provide an LVDS signaling scheme between spacecraft electronic components.

FIG. 1 illustrates an exemplary prior art spacecraft electronic system architecture that includes first and second line replaceable units (LRUs) 10, 11, but without galvanic isolation components to protect the signal integrity. Specifically, LRU 10 includes signal processing circuitry, such as field-programmable gate array (FPGA) 111, and connectors and high-speed board traces 114 configured to provide an electrical connection between LRU 10 and another electronic component. LRU 11 also includes signal processing circuitry, such as FPGA 112, and connectors and high-speed board traces 115 configured to provide an electrical connection between LRU 11 and another electronic component. High-speed wiring 113 is coupled to the respective connectors of LRUs 10, 11 to provide electrical communication therebetween. However, as noted above, such a scheme may render the signals—as well as the functioning of the LRUs—susceptible to electromagnetic interference (EMI). As will be familiar to those skilled in the art, some protection of the signals between LRU 10 and LRU 11 may be provided by shielding and equalization of ground potential between the two components.

Figure 2A:
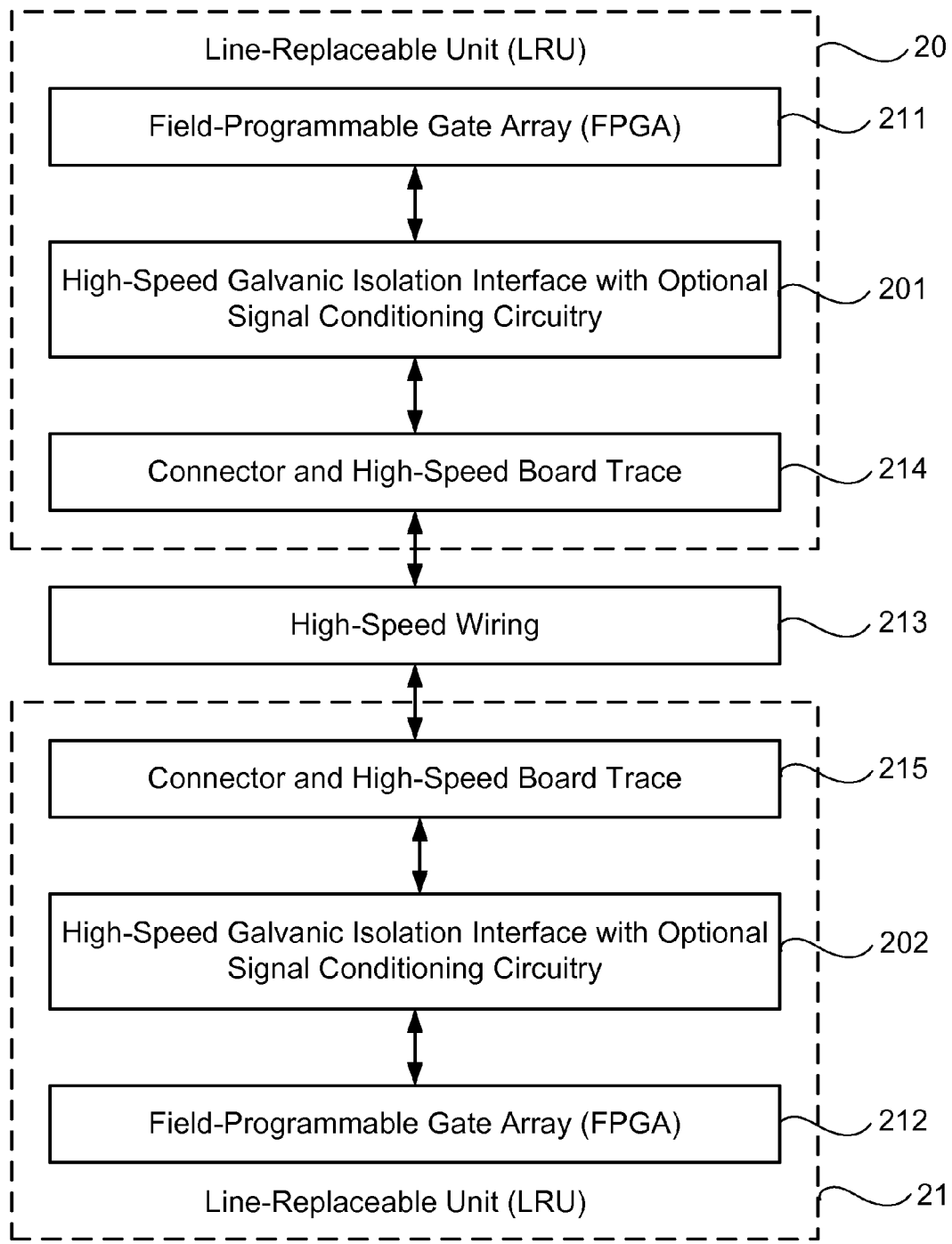
FIG. 2A illustrates a high-level block diagram of spacecraft electronic components that are coupled using high-speed galvanic isolation interface elements, according to some embodiments of the present invention.

FIG. 2A illustrates an exemplary spacecraft electronic system that includes first and second line replaceable units (LRUs) 20, 21 that respectively include high-speed galvanic isolation interface elements 201, 202 of the present invention. Specifically, first LRU 20 includes field programmable gate array (FPGA) 211, high-speed galvanic isolation interface 201, and connectors and high-speed board traces 214 configured to provide electrical connection(s) between LRU 20 and another electronic component. Second LRU 21 includes FPGA 212, high-speed galvanic isolation interface 202, and connectors and high-speed board traces 215 configured to provide electrical connection(s) between LRU 21 and another electronic component. High-speed wiring 213 is coupled to the respective connectors of LRUs 20, 21 to provide electrical communication therebetween. Note that one or both of FPGAs 211 and 212 suitably may be interchanged with other signal processing components, such as a complex programmable logic device (CPLD), a computer processing unit (CPU), a digital signal processor (DSP), or micro-controller unit (MCU) appropriate to the functionality implemented by the LRU's electronic architecture.

Within first LRU 20, FPGA 211, high-speed galvanic isolation interface element 201, and connectors and high-speed board traces 214 may be bonded (e.g., soldered) to a common printed circuit board with a suitable conductive material. High-speed galvanic isolation interface 201 may be electronically connected to the appropriate inputs and outputs of the FPGA that are intended to be transmitted externally to LRU 20 or received from an external LRU. Within second LRU 21, FPGA 212, high-speed galvanic isolation interface 202, and connectors and high-speed board traces 215 analogously may be bonded (e.g., soldered) to a common printed circuit board with a suitable conductive material. The connector of first LRU 20 may be detachably coupled to high-speed wiring 213, and the connector of second LRU 21 similarly may be detachably coupled to high-speed wiring 213. High-speed wiring 213 may be, for example, suitable cabling such as a shielded metallic cable.

FPGAs 211, 212 are each independently configured to provide SpaceWire and/or SpaceFibre signaling functionality as well as one or more functionalities compatible with SpaceWire and/or SpaceFibre signaling standards, such as an imager, a sensor, or communications equipment. High-speed galvanic isolation interface 201 of first LRU 20 is configured to transmit signals to, and receive signals from, high-speed galvanic isolation interface 202 of second LRU 21, as produced or received by, FPGA 211. Similarly, high-speed galvanic isolation interface 202 of second LRU 21 is configured to transmit signals to, and receive signals from, high-speed galvanic isolation interface 201 of first LRU 20, as well as produced or received by FPGA 212. FPGAs 211, 212 preferably comply with the ANSI/TIA/EIA-644 standard, as required by the SpaceWire and SpaceFibre standards.

However, rather than directly (non-galvanically) coupling the external signals traveling between LRU 20 and LRU 21, such as illustrated in FIG. 1, embodiments of the present invention provide high-speed galvanic isolation interfaces 201, 202 disposed between each LRU's connectors and its internal electronic components so as to enhance electrical stability of the spacecraft electronic system. For example, in first LRU 20, high-speed galvanic isolation interface 201 is disposed between FPGA 211 and connectors and high-speed board traces 214, and provides isolated replicas of signals therebetween in a bidirectional manner (illustrated as double-headed arrows in FIG. 2A). Optionally, and as described in greater detail below, interface 201 also includes signal conditioning circuitry configured to improve the signal-to-noise (SNR) ratio of the signals received by FPGA 211 from FPGA 212 or transmitted by FPGA 211 to FPGA 212, for example, by amplifying the isolated signal replica or by providing clock recovery functionality compliant with SpaceWire or SpaceFibre. Similarly, in second LRU 21, high-speed galvanic isolation interface 202 is disposed between FPGA 212 and connectors and high speed board traces 215, and provides optionally conditioned (e.g., amplified) isolated replicas of signals therebetween in a bidirectional manner. Wiring 213 is disposed between connectors and high-speed board traces 214 and connectors and high-speed board traces 215. As such, interfaces 201 and 202 inhibit the transfer of charged particles between selected electronic components, in the spacecraft electronic system, e.g., between FPGAs 211, 212, while facilitating the bidirectional, high-speed transmission of signals therebetween. Note that FPGAs 211, 212 need not necessarily be part of different LRUs, but both may be part of the same LRU.

Figure 2B:
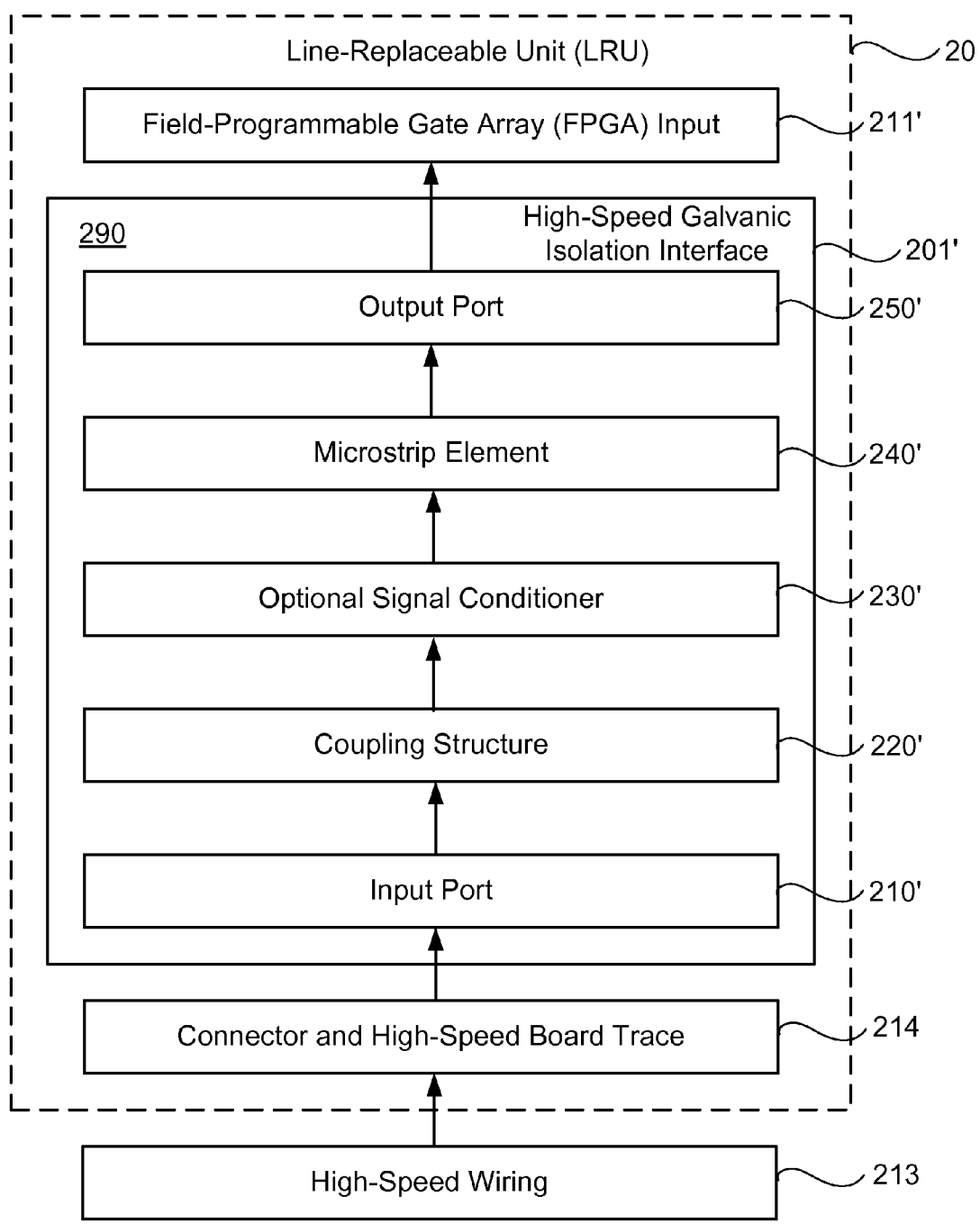
FIG. 2B illustrates a block diagram of one embodiment of a high-speed galvanic isolation interface of the present invention configured to receive a signal at a first spacecraft electronic component from a second spacecraft electronic component.
Figure 2C:
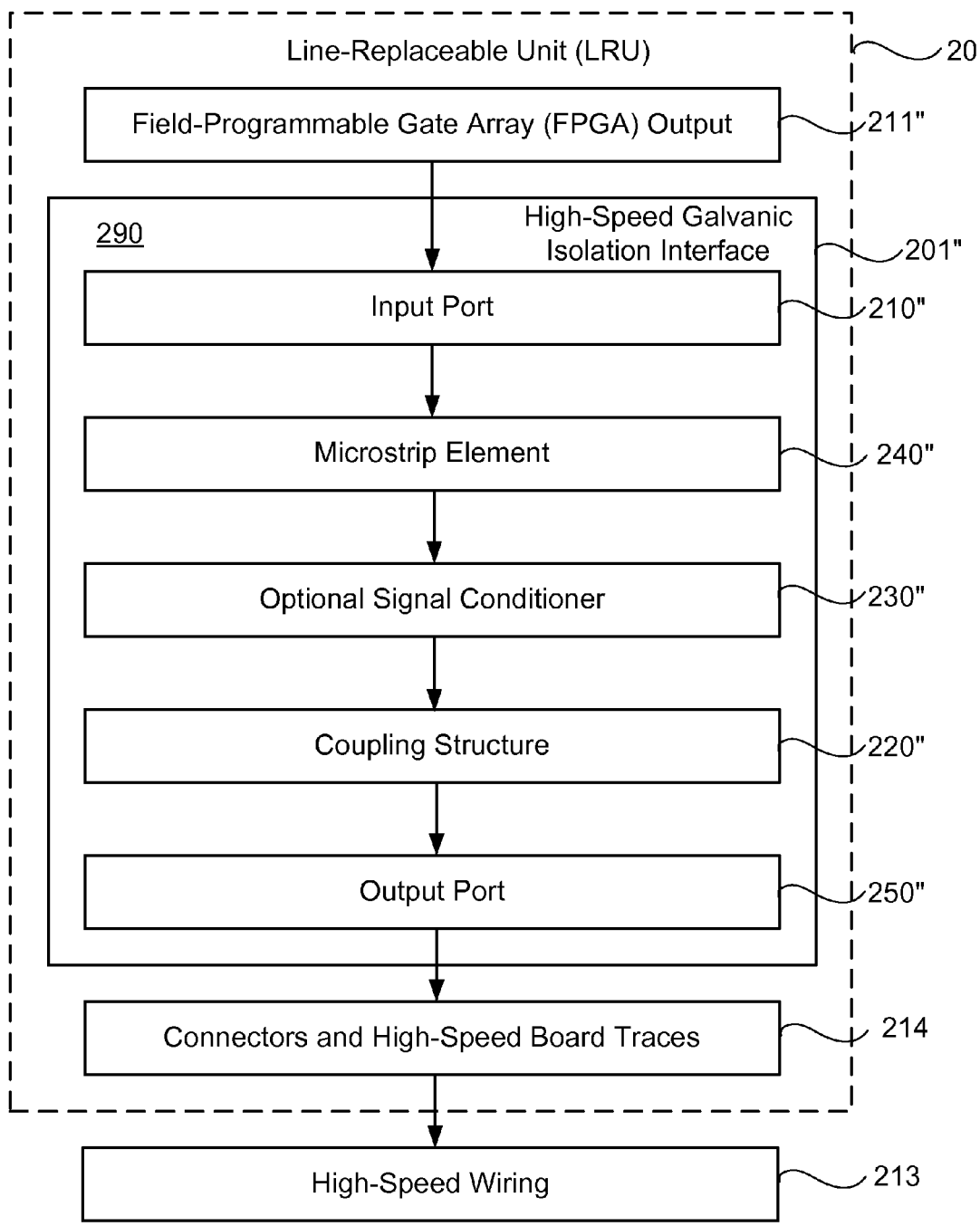
FIG. 2C illustrates a block diagram of one embodiment of a high-speed galvanic isolation interface of the present invention configured to provide a signal from a first spacecraft electronic component to a second spacecraft electronic component. Note that the signal may or may not related to the signal shown in FIG. 2A, but in implementing LVDS signaling schemes using elements built per the architecture described in FIGS. 2A and 2B, the relationship between the signals would be as expected in the protocol.

FIGS. 2B-2C are block diagrams of exemplary embodiments of high-speed galvanic isolation interface element 201, which as described above may be disposed between, and coupled to, FPGA 211 and connectors and high-speed board traces 214 of LRU 20. Specifically, as illustrated in FIG. 2B, interface element 201' is configured to provide unidirectional communication from an external electronic component to input 211' of FPGA 211, while as described further below with reference to FIG. 2C, interface element 201" is configured to provide unidirectional communication from output 211" of FPGA 211. It should be appreciated that interface 201 (e.g., interfaces 201' and 201" together) suitably may be disposed between, and coupled to, any two electronic components in a spacecraft that receive signals from one another and may benefit from being galvanically isolated from one another. For example, interface 201 may be disposed between two FPGAs, which may be in separate LRUs from one another or both may be in the same LRU as one another. Additionally, although interface 202 of LRU 21 is not specifically described herein, it should be understood that interface 202 may have any suitable structure described herein, e.g., structures analogous to those which will now be described with reference to FIGS. 2B-2C.

As illustrated in FIG. 2B, interface 201' includes input port 210', coupling structure 220', optional signal conditioner 230', microstrip element 240', and output port 250', each of which is disposed on semi-insulating substrate 290 that is bonded to a common printed circuit board as FPGA input 211' and connectors and high-speed board traces 214. Input port 210' is coupled to an external electronic component via connectors and high-speed board traces 214 and also is coupled to coupling structure 220'. Input port 210' is configured to receive a signal from an external electronic component, e.g., second LRU 21, via high speed wiring 213 and to provide the signal to coupling structure 220'. Preferably, input port 210' includes a metallic pad configured so as to have similar impedance as does the output of connectors and high-speed board traces 214, so as to reduce reflection of the signal back into high speed wiring 213 and enhance the magnitude of the signal received by interface 201'.

Coupling structure 220' is coupled to input port 210' and to optional signal conditioner 230', and is configured to receive the signal from input port 210' and to provide an isolated replica of the signal to signal conditioner 230'. Optional signal conditioner 230' is coupled to coupling structure 220' and to microstrip element 240', and is configured to receive the isolated signal replica from coupling structure 220', to condition, e.g., amplify the isolated signal replica, and to provide the conditioned, isolated signal replica to microstrip element 240'. Microstrip element 240' is coupled to optional signal conditioner 230' and to output port 250', and is configured to receive the impedance matched, conditioned, isolated signal replica from microstrip element to provide the impedance matched, conditioned, isolated signal replica to output port 250'. Microstrip element 240' is configured to provide connectivity and impedance matching to enhance the signal integrity between the optional signal conditioner 230' and the output port 250', and subsequently to the input 211' of FPGA 211. As is known in the art, microstrip elements are transmission lines configured to conduct microwave signals, e.g., signals having frequencies of 400 MHz and above. The skilled artisan may select the particular configuration (e.g., width, length, and thickness) of a microstrip element based upon the particular materials used for the substrate and the microstrip element to meet the desired performance characteristics (e.g., line loss, reflectivity, and the like). In one example, microstrip element 240' comprises a metallic strip disposed on the upper surface of substrate 290 and a solid ground plane metallic layer disposed on the lower surface of substrate 290, such that substrate 290 is disposed between the metallic strip and the ground layer. In another example, referred to as a "coplanar" configuration, both the metallic strip and the solid ground plane metallic layer are disposed on the upper surface of substrate 290 and spaced apart from one another by a suitable distance to provide field effects that facilitate transmission of signals through the metallic strip.

Output port 250' is coupled to microstrip element 240' and to connectors and high-speed board traces 214, and is configured to receive the impedance matched, conditioned, isolated signal replica from microstrip element 240' and to provide the signal to connectors and high-speed board traces 214. Preferably, output port 250' is a metallic pad configured so as to have similar impedance as does the input 211' of FPGA 211, so as to reduce reflection of the conditioned, isolated signal replica back into interface 201' and to enhance the magnitude of the signal received by FPGA 211. Optionally, signal conditioner 230' may be omitted, in which case coupling structure 220' may be connected directly to output port 250'.

Preferably, input port 210', coupling structure 220', optional signal conditioner 230', microstrip element 240', and output port 250' are all disposed on a single, common semi-insulating substrate 290. Examples of suitable semi-insulating substrates 290 include, but are not limited to, gallium arsenide (GaAs), gallium nitride (GaN), silicon carbide (SiC), silicon-on-sapphire (SOS) or silicon-on-insulator (SOI), of which GaAs is particularly preferred. Preferably, semi-insulating substrate 290 provides a relatively high-resistance pathway to ground, has a relatively high breakdown voltage, and is relatively resistant to the formation of eddy currents such as may disrupt electronics based on silicon substrates.

Input port 210', coupling structure 220', optional signal conditioner 230', and output port 240' also preferably are all defined lithographically, that is, using well-established photolithographic techniques, and are at least partially metallic for improved conductance. For example, input port 210', coupling structure 220', signal conditioner 230', microstrip element 240', and output port 250' may be formed by evaporating or plating a metal, such as gold, onto the substrate, and lithographically patterning the metal so as to define the features. It should be understood that certain components of optional signal conditioner 230' may not necessarily be metallic. For example, signal conditioner 230' may include one or more field effect transistors (FETs) that may include materials other than metals. One example of a FET that suitably may be used in signal conditioner 230' is a pseudomorphic high electron mobility transistor (pHEMT), which may include one or more thin layers of materials such as GaAs or aluminum gallium arsenide (AlGaAs). Suitable processing techniques for forming MMIC structures such as amplifiers along with microstrip structures such as transmission lines, impedance adaption, and isolation features on substrates such as GaAs, are well known. Non-lithographic techniques for forming input port 210', coupling structure 220', signal conditioner 230', microstrip element 240', and output port 250', as well as non-metallic conductive materials, also suitably may be used.

In some embodiments, coupling structure 220' includes a Lange coupler. Lange couplers have one input port, three output ports, and multiple interdigitated fingers, some of which are coupled to the input port and others of which are coupled to one or more of the output ports. A signal applied to the input port travels along some of the fingers, which induces formation of an isolated replica of the signal on others of the fingers. The isolated replica then may be obtained from the appropriate port of the Lange coupler. In some embodiments, the input port of a Lange coupler may suitably function as input port 210'. An exemplary design for a suitable Lange coupler that may be employed in the present invention is that of model no. TGB2001, manufactured by TriQuint Semiconductor, Inc. (Hillsboro, Oreg.). According to the manufacturer, the TGB2001 Lange coupler has a bandwidth of 12-21 GHz; as such, the coupler supports a data rate compatible with at least the SpaceFibre standard. As will be appreciated by those skilled in the art, the specific design of the Lange coupler may be modified so as to enhance performance within a particular frequency band in which the coupler is to be used. For further details on Lange couplers, see U.S. Pat. No. 3,516,024 to Lange, the entire contents of which are incorporated by reference herein. In an alternative embodiment, coupling structure 220' includes a directional coupler.

In some embodiments, optional signal conditioner 230' includes at least a MMIC amplifier, and possibly other components, e.g., as described further below with reference to FIGS. 3A-3B. MMIC amplifiers may include active devices, such as microwave transistors, and matching circuitry, and may include an input port for receiving a signal and an output port for providing an amplified version of that signal. In some embodiments, the output port may suitably function as output port 250'. An exemplary design for a suitable MMIC amplifier that may be employed in the present invention is that of model no. TGA2513, manufactured by TriQuint Semiconductor, Inc. (Hillsboro, Oreg.). According to the manufacturer, the TGA2513 MMIC amplifier has a bandwidth of 2-23 GHz; as such, the amplifier supports a data rate compatible with at least the SpaceFibre standard. Another exemplary design for a suitable MMIC amplifier that may be employed in the present invention is that of model no. HMC490LC4B, manufactured by Hittite Microwave Corporation (Chelmsford, Mass.). According to the manufacturer, the HMC490LC4B MMIC amplifier has a serial data transmission rate of up to 13 Gbit/second; as such, the amplifier supports a data rate compatible with at least the SpaceFibre standard. As will be appreciated by those skilled in the art, the specific design of the MMIC amplifier may be modified so as to enhance performance within a particular frequency band in which the amplifier is to be used. For example, resistors, capacitors, and/or passive elements may be provided to stabilize and adjust or tune the parameters of the amplifier.

Other examples of circuitry that may be provided in optional signal conditioner 230' may include MMIC multiplexers, demultiplexers, optical modulators, and the like. An exemplary design for a suitable MMIC multiplexer that may be employed in the present invention is that of model no. HMC847LC5, and an exemplary design for a suitable MMIC demultiplexer that may be employed in the present invention is that of model no. HMC848LC5, both manufactured by Hittite Microwave Corporation (Chelmsford, Mass.). According to the manufacturer, the HMC847LC5 multiplexer and the HMC848LC5 demultiplexer are both designed for 45 Gbit/second serialization, and thus both would support a data rate compatible with at least the SpaceFibre standard. An exemplary design for a suitable optical modulator driver is that of model no. TGA4954-SL, manufactured by TriQuint Semiconductor Inc. (Hillsboro, Oreg.). According to the manufacturer, the TGA4954-SL optical modulator driver supports a data throughput rate of 9.9 to 12.5 Gbit/second; as such, the driver supports a data rate compatible with at least the SpaceFibre standard. As will be appreciated by those skilled in the art, the specific design of the components of signal conditioner 230' may be modified so as to enhance performance within a particular frequency band in which the signal conditioner is to be used. For example, resistors, capacitors, and/or passive elements may be provided to stabilize and adjust or tune the parameters of the signal conditioner.

In preferred embodiments in which input port 210', coupling structure 220', signal conditioner 230', microstrip element 240', and output port 250' are disposed on a common semi-insulating substrate 290, are metallic, and have at least some features that may be formed using common lithographic processing techniques, such elements are expected to provide enhanced signal stability and isolation, improved feature formation and repeatability of manufacturing, and increased rates of signal throughput as compared to previously known isolation interfaces such as described above. It will be appreciated that in alternative embodiments, one or more of input port 210', coupling structure 220', signal conditioner 230', microstrip element 240', and output port 250' may be disposed on different semi-insulating substrates than one another. For example, input port 210' and coupling structure 220' may be disposed on a first semi-insulating substrate, while signal conditioner 230', microstrip element 240' and output port 250' may be disposed on a second semi-insulating substrate. The substrates may be formed of the same material as one another, or of different materials.

As noted above, interface element 201' illustrated in FIG. 2B is configured to provide unidirectional communication from an external electronic component to input 211' of FPGA 211. FIG. 2C illustrates interface element 201", which is configured to provide unidirectional communication from output 211" of FPGA 211. It will be understood that interface elements 201' and 201" may be integral with one another, e.g., both disposed on the same semi-insulating substrate 290, or alternatively may be separately provided from one another, so as to collectively provide bi-directional communication from FPGA 211 to an external electronic component. However, in some embodiments only one of interfaces 201' and 201" may be included in LRU 20, e.g., so that only unidirectional communication between FPGA 211 and an external electronic component is provided.

As illustrated in FIG. 2C, high-speed galvanic isolation interface element 201" may be disposed between, and coupled to, output 211" of FPGA 211 and connectors and high-speed board traces 214. However, it should be appreciated that interface 201" suitably may be disposed between, and coupled to, any two electronic components in a spacecraft that transmit signals to one another and may benefit from being galvanically isolated from one another. For example, interface 201" may be disposed between two FPGAs, which may be in separate LRUs from one another or both may be in the same LRU as one another.

As illustrated in FIG. 2C, input port 210", microstrip element 240", optional signal conditioner 230", coupling structure 220", and output port 250" of high-speed galvanic isolation interface 201" are disposed on semi-insulating substrate 290 and together provide unidirectional transmission signal communication from FPGA output 211" to connectors and high-speed board traces 214 through interface 201" (represented by single-headed arrows). The arrangement illustrated in FIG. 2C is particularly well suited for such unidirectional transmission signal communication, because any externally generated EMI signals that would otherwise be received on output port 250" via connectors and high-speed board traces 214 would be isolated immediately. As such, only the desired transmission signals would be conditioned, e.g., amplified by the optional signal conditioner 230", so the integrity (gain and isolation) of the signal from FPGA output 211" would be improved, resulting in more desirable signal processing at the receiving destination, e.g., at second LRU 21.

As depicted in FIG. 2C, a set of elements 210", 220", 230", 240", and 250" may be provided on the same semi-insulating substrate 290 with precision lithographic processes. To provide fully isolated transmission of signals, the elements 210", 220", 230", 240", and 250" may be analogous to those described above with reference to FIG. 2B, but provided in a different sequence. Specifically, coupling structure 220" instead may be disposed between optional signal conditioner 230" and output port 250" to provide unidirectional transmission signal communication from output 211" of FPGA 211 to an external component via connectors and high-speed board traces 214 in a direction opposite to that shown in FIG. 2C. This shift in sequence provides signal conditioner 230" (for example, a gain stage) prior to the coupling structure 220", which may improve the signal integrity as the signal exits the isolation interface 201". Alternatively, in embodiments where signal conditioners 230" are omitted, elements 210", 220", 240", and 250" suitably may be used in a manner without the need for signal conditioning, e.g., where the signal strength generated by an electronic component within LRU 20, e.g., FPGA 211, is sufficient to maintain signal integrity when traversing the coupling structure. Optimization of the design for the differences in signal strength coming from FPGA 211 or from connectors and high speed board traces 214 may include difference impedance matching structures depending on the direction of the signal across the high-speed galvanic isolation interface element 201".

As will be appreciated by those skilled in the art, the feature size of the input ports 210', 210", coupling structures 220', 220", signal conditioners 230', 230", microstrip elements 240', 240", and output ports 250', 250" may be selected so as to be compatible with the signal frequenc(ies) to be transmitted therethrough.

FIGS. 3A-3B and 4A-4B illustrate alternative embodiments of high-speed galvanic isolation interfaces that are particularly well suited for transmitting or receiving SpaceWire and/or SpaceFibre-compliant signals. As is known to those familiar with SpaceWire and SpaceFibre, those standards provide for transmission of a given signal as a differential pair of signals, that is, as a pair of signals that are inverses of one another along with a protocol for timing using a similar differential pair of signals for a strobe signal. The signals of the receive signal pair may be referred to as RxD+ and RxD−. Similarly, signals from a transmission source such as FPGA 111 can be designated as TxD+ and TxD− and routed via a transmission path using the LVDS protocol. Such a signaling arrangement may reduce the voltage required to transmit the signal while maintaining a satisfactory signal to noise ratio (SNR). The SpaceWire/SpaceFibre signaling protocol identifies eight (8) signals that are identified for fully implementing the standard as described in ECSS-E-ST-50-12C. The impedance of the signaling may established to conform to the LVDS signaling scheme or selected to alternate impedances through the use of matching elements to improve signal integrity.

Figure 3A:
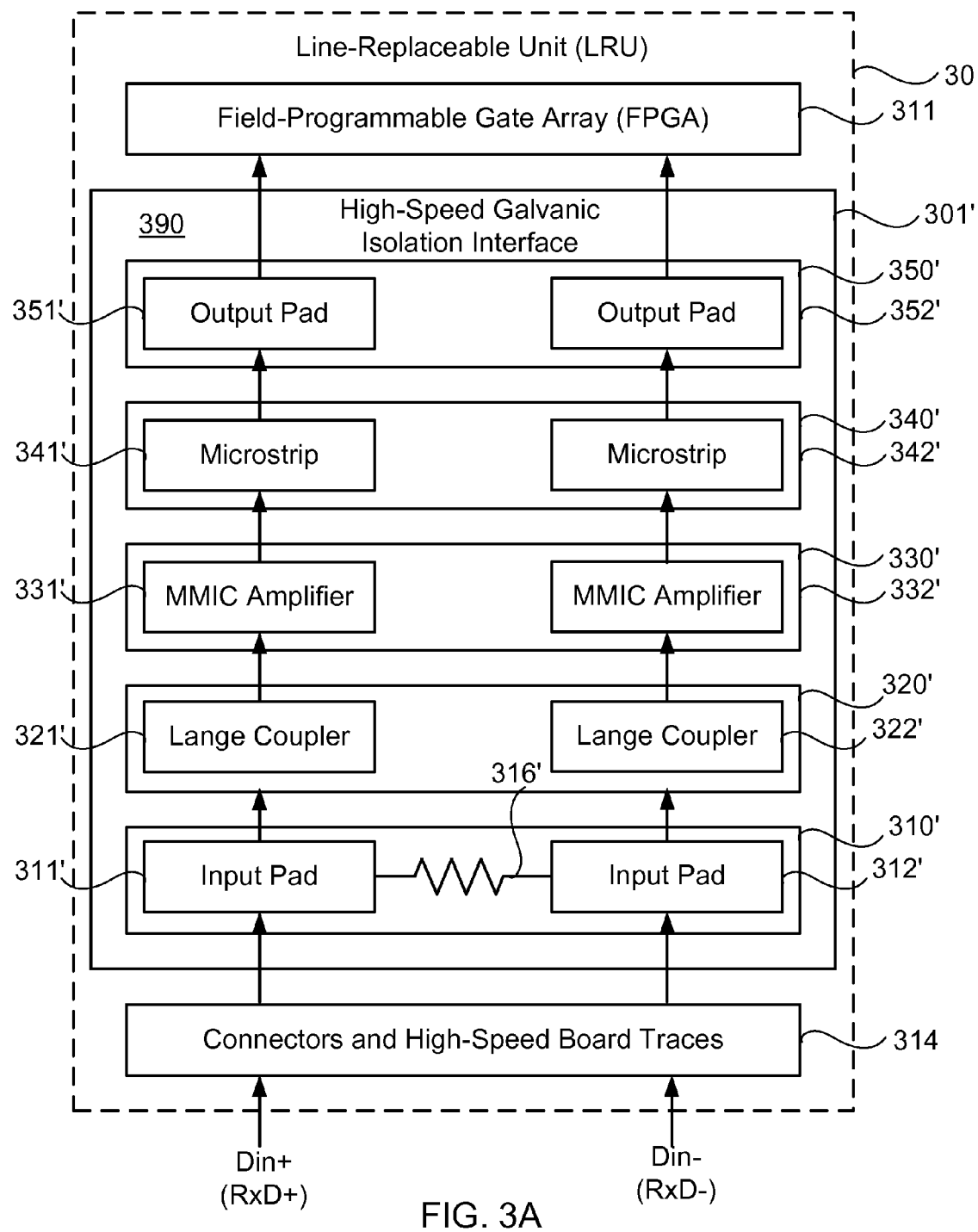
FIG. 3A illustrates a block diagram of one embodiment of a high-speed galvanic isolation interface of the present invention configured to receive a pair of related signals at a first spacecraft electronic component from a second spacecraft electronic component.

As illustrated in FIG. 3A, LRU 30 includes high-speed galvanic interface 301' and FPGA 311. In this embodiment, interface 301', includes elements suitable for separately receiving the Din+ (RxD+) and Din− (RxD−) signals compliant with the SpaceWire and SpaceFibre protocols from an external electronic component, e.g., from connectors and high-speed board traces 314, and transmitting those signals to FPGA 311, in an isolated, unidirectional manner. In comparison, interface 301" described further below with reference to FIG. 3B includes elements suitable for transmitting the Dout+ (TxD+) and Dout− (TxD−) signals compliant with the SpaceWire and SpaceFibre from an internal electronic component, e.g., from FPGA 311, to a second, external electronic component in an isolated, unidirectional manner via connectors and high-speed board traces 314. It should be understood that any other SpaceWire and/or SpaceFibre-compliant electronic components, or for that matter any other electronic components that utilize pairs of signals, which signals may or may not be related to one another, suitably may be interconnected using high-speed galvanic isolation interfaces 301' or 301", described further below. Additionally, note that FPGA 311 suitably may be interchanged with other signal processing components, such as a complex programmable logic device (CPLD), a computer processing unit (CPU), a digital signal processor (DSP), or micro-controller unit (MCU) appropriate to the functionality implemented by the LRU's electronic architecture.

As illustrated in FIG. 3A, high-speed isolation interface 301' includes input port 310', coupling structure 320', optional signal conditioner 330', microstrip structure 340', and output port 350' disposed on semi-insulating substrate 390. Input port 310' includes first and second input pads 311', 312', which are respectively configured to receive RxD+ and RxD− signals from an external electronic component (not shown). First and second input pads 311', 312' may be coupled by a resistive or other impedance element 316' designed to bring the input pads to the correct impedance, e.g., 100 ohms per the LVDS standard. Coupling structure 320' includes first and second Lange couplers 321', 322', which are respectively configured to receive the RxD+ and RxD− signals from the first and second input pads 311', 312' and to generate isolated replicas of those signals. Transforming of the impedance characteristics of the various elements may be implemented to reduce the losses, transform the impedance, and improve the signal integrity. For example, first and second Lange couplers 321', 322' may be configured as 50 ohm transmission lines, so as to impedance match first and second input pads 311', 312'.

In the illustrated embodiment, optional signal conditioner 330' includes first and second MMIC amplifiers 331', 332', which are respectively configured to receive the isolated RxD+ and RxD− signals from the first and second Lange couplers 321', 322' and to output conditioned, e.g., amplified, versions of those signals. Microstrip structure 340' includes first and second microstrip elements 341', 342', which are respectively configured to receive the conditioned isolated RxD+ and RxD− signals from the first and second MMIC amplifiers 331', 332', and to provide those signals to first and second output pads 351', 352' of output port 350. First and second microstrip elements 341', 342' may be configured as 50 ohm transmission lines, and first and second output pads 351', 352' may provide 50 ohm output impedance, and may be provided as part of, and integral with, MMIC amplifiers 331', 332'. Note that the components of interface 301' may be configured so as to provide any suitable input and output impedances to improve signal integrity (which need not necessarily be the same as one another), and are not limited to 50 ohms, although 50 ohms may be particularly useful because many spacecraft electronic components have 50 ohm input and output impedances.

FPGA 311 receives as input the respective amplified RxD+ and RxD− signals from output pads 351', 352' and processes the signals accordingly. As provided by the SpaceWire and SpaceFibre standards, FPGA 311 may be configured to perform differential signal recovery processing based on the two separate signals. An example of an FPGA that may be so configured is the VIRTEX-5 FPGA manufactured by Xilinx, Inc. (San Jose, Calif.). In this regard, it should be noted that the phase relationship between the RxD+ and RxD− signals as the two signals pass through interface 301' is relatively stable because all of the circuitry is disposed on a common substrate and defined lithographically and modern process control provides consistency of the characteristics of the components of interface 301'. As such, FPGA 311 may readily and consistently determine the phase relationship between the two signals as they are processed, e.g., differentially combining, the signals. The receive strobe signals, RxS+ and RxS−, provided by the SpaceWire and SpaceFibre standards would also follow a similar reception path as that illustrated in FIG. 3A.

Figure 3B:
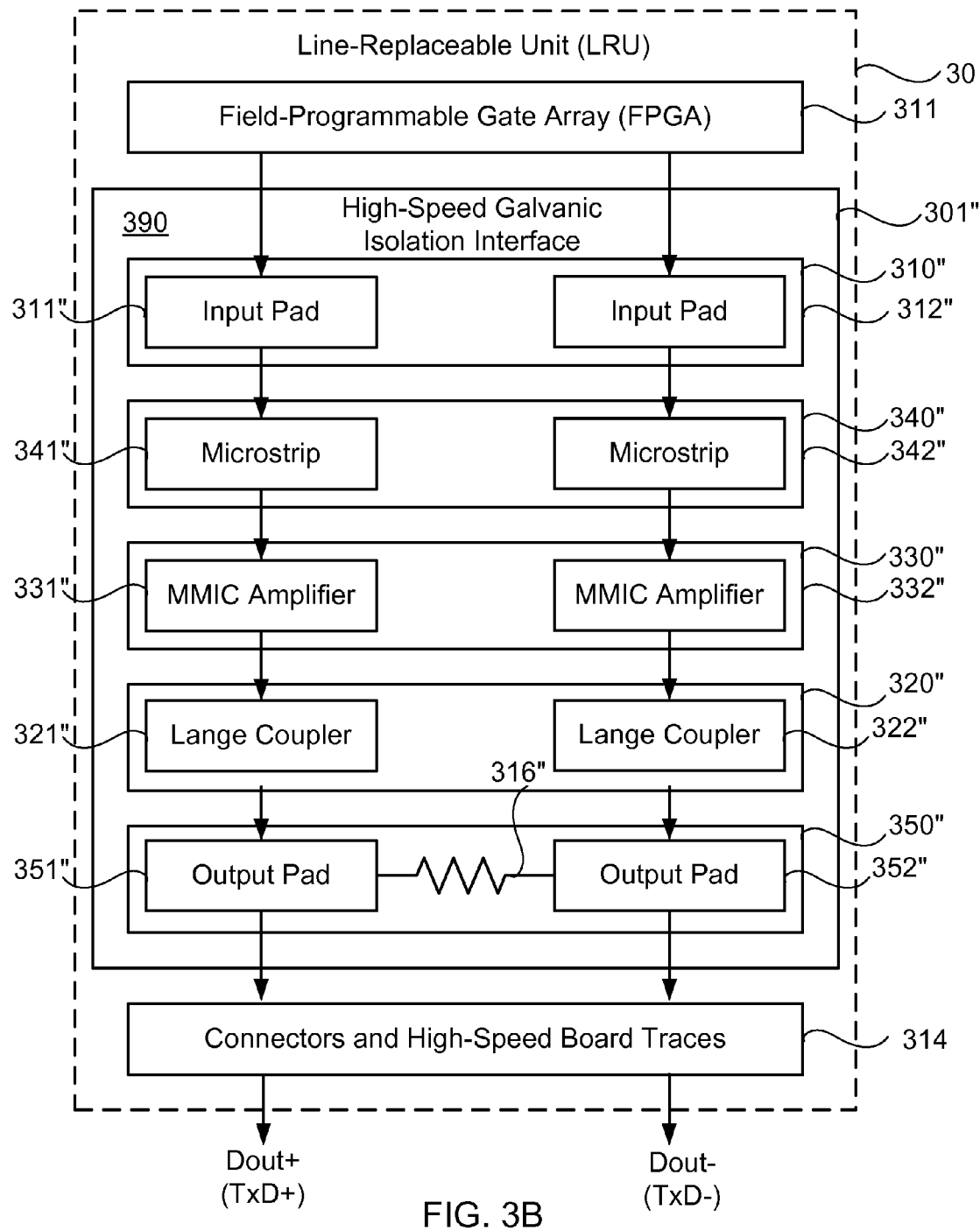
FIG. 3B illustrates a block diagram of an alternative embodiment of a high-speed galvanic isolation interface of the present invention configured to provide a pair of related signals from a first spacecraft electronic component to a second spacecraft electronic component.

As shown in FIG. 3B, LRU 30 of FIG. 3A also may include high-speed isolation interface 301". FPGA 311 outputs transmitted signals Dout+ (TxD+) and Dout− (TxD−), which travel to input pads 311", 312" of input port 310" of high speed isolation link interface 301". The elements, while similar to the reception channel described in FIG. 3A, may differ in configuration and sequence to provide signal integrity and galvanic isolation of the FPGA transmitted signal. Additionally, as described above with reference to FIG. 3A, the impedance of the signaling may established to conform to the LVDS signaling scheme or optimized to alternate impedances through the use of matching elements to improve signal integrity.

As illustrated in FIG. 3B, high-speed isolation interface 301" includes input port 310", coupling structure 320", optional signal conditioner 330", microstrip structure 340", and output port 350" disposed on semi-insulating substrate 390, which may be the same substrate as in FIG. 3A. Input port 310" includes first and second input pads 311", 312", which are respectively configured to receive TxD+ and TxD− signals output by FPGA 311. First and second microstrip elements 341", 342" of microstrip structure 340" are respectively configured to receive the TxD+ and TxD− signals from the first and second input ports 311", 312". First and second microstrip elements 341", 342" may be configured as 50 ohm transmission lines, and may be provided as part of, and integral with, MMIC amplifiers 331", 332" of signal conditioner 330'. First and second MMIC amplifiers 331", 332" are respectively configured to receive the isolated TxD+ and TxD− signals from the first and second microstrip elements 341", 342".

Coupling structure 320" includes first and second Lange couplers 321", 322", which are respectively configured to receive the TxD+ and TxD− signals from MMIC amplifiers 331" and 332". The first and second Lange couplers 321", 322" are respectively configured to receive conditioned, e.g., amplified, versions of those signals, and may be configured as 50 ohm transmission lines, so as to impedance match first and second output pads 351", 352" of output port 350". The first and second Lange couplers 321", 322" are configured to generate isolated replicas of the TxD+ and TxD− signals. First and second output pads 351", 3152" are configured to receive the amplified isolated replicas of the signals, which they then convey to connectors and high speed board traces 314. First and second output pads 351", 352" may be coupled by a resistive or other impedance element 316" configured to bring the output pads to the correct impedance, e.g., 100 ohms per the LVDS standard. Transforming of the impedance characteristics of the various elements may be implemented to reduce the losses, transform the impedance, and improve the signal integrity. Note that the components of interface 301' may be configured so as to provide any suitable input and output impedances to improve signal integrity (which need not necessarily be the same as one another), and are not limited to 50 ohms, although 50 ohms may be particularly useful because many spacecraft electronic components have 50 ohm input and output impedances.

As provided by the SpaceWire and SpaceFibre standards, FPGA 311 may be configured to perform differential signal transmission processing to output two separate signals, e.g., as illustrated in FIG. 3B. In this regard, it should be noted that the phase relationship between the RxD+ and RxD− signals as the two signals pass through interface 301" is relatively stable because all of the circuitry is disposed on a common substrate and defined lithographically and modern process control provides consistency of the manufacture of the elements of interface 301". As such, FPGA 311 may readily and consistently generate the phase relationship between the two signals as they are processed, e.g., differentially generating, the signals. The transmission strobe signals, TxS+ and TxS−, provided by the SpaceWire and SpaceFibre protocols would also follow a similar transmission path as that illustrated in FIG. 3B.

Figure 4A:
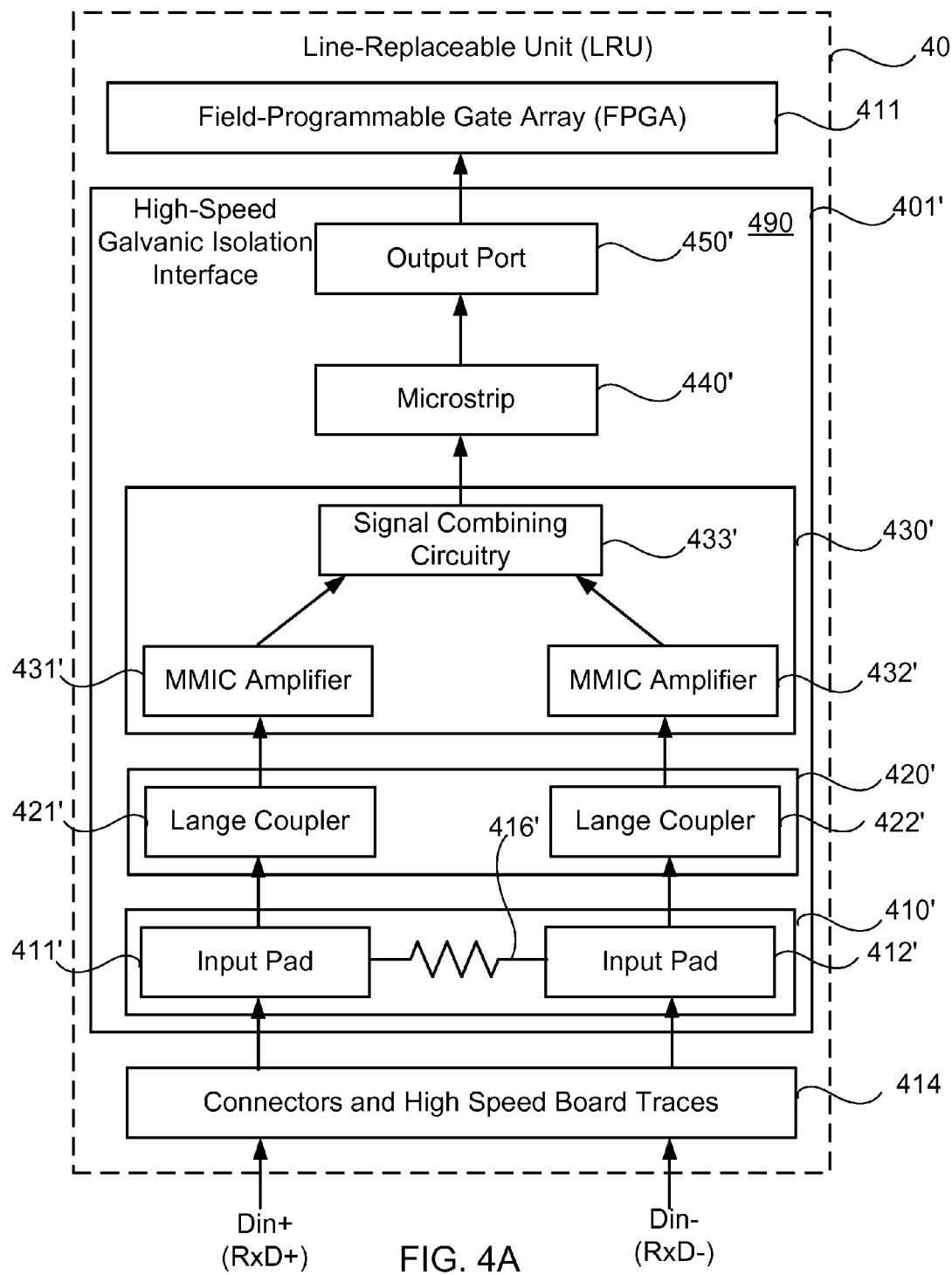
FIG. 4A illustrates a block diagram of an alternative high-speed galvanic isolation interface of the present invention configured to receive a pair of related signals at a first spacecraft electronic component from a second spacecraft electronic component, with the addition of signal combining circuitry to further process the signals.

Alternatively, as illustrated in FIG. 4A, LRU 40 includes modified high-speed isolation interface, FPGA 411, and connectors and high-speed board traces 414. Modified high-speed isolation interface 401' includes input port 410', coupling structure 420', modified signal conditioner 430', modified microstrip structure 440', and modified output port 450', disposed on semi-insulating substrate 490. Input port 410' and coupling structure 420' may be substantially the same as those described above with reference to FIG. 4A. However, interface 401' includes a modified signal conditioner 430' that includes MMIC amplifiers 431', 432', which may be the same as described above, as well as signal combining circuitry 433'. Signal combining circuitry 433' is configured to receive the isolated, amplified RxD+ and RxD− signals from MMIC amplifiers 431', 432' and to differentially combine the signals together. Circuitry 433' outputs the differential combination of the isolated, amplified RxD+ and RxD− signals to microstrip structure 440', which provides the combination to output port 450', which may be a conductive pad. FPGA 411 receives as input the differential combination from output port 450' and processes the combined signal accordingly. As in FIGS. 3A and 3B, the impedance of the signaling may established to conform to the LVDS signaling scheme or optimized to alternate impedances through the use of matching elements to improve signal integrity. Additionally, note that FPGA 411 suitably may be interchanged with other signal processing components, such as a complex programmable logic device (CPLD), a computer processing unit (CPU), a digital signal processor (DSP), or micro-controller unit (MCU) appropriate to the functionality implemented by the LRU's electronic architecture.

Figure 4B:
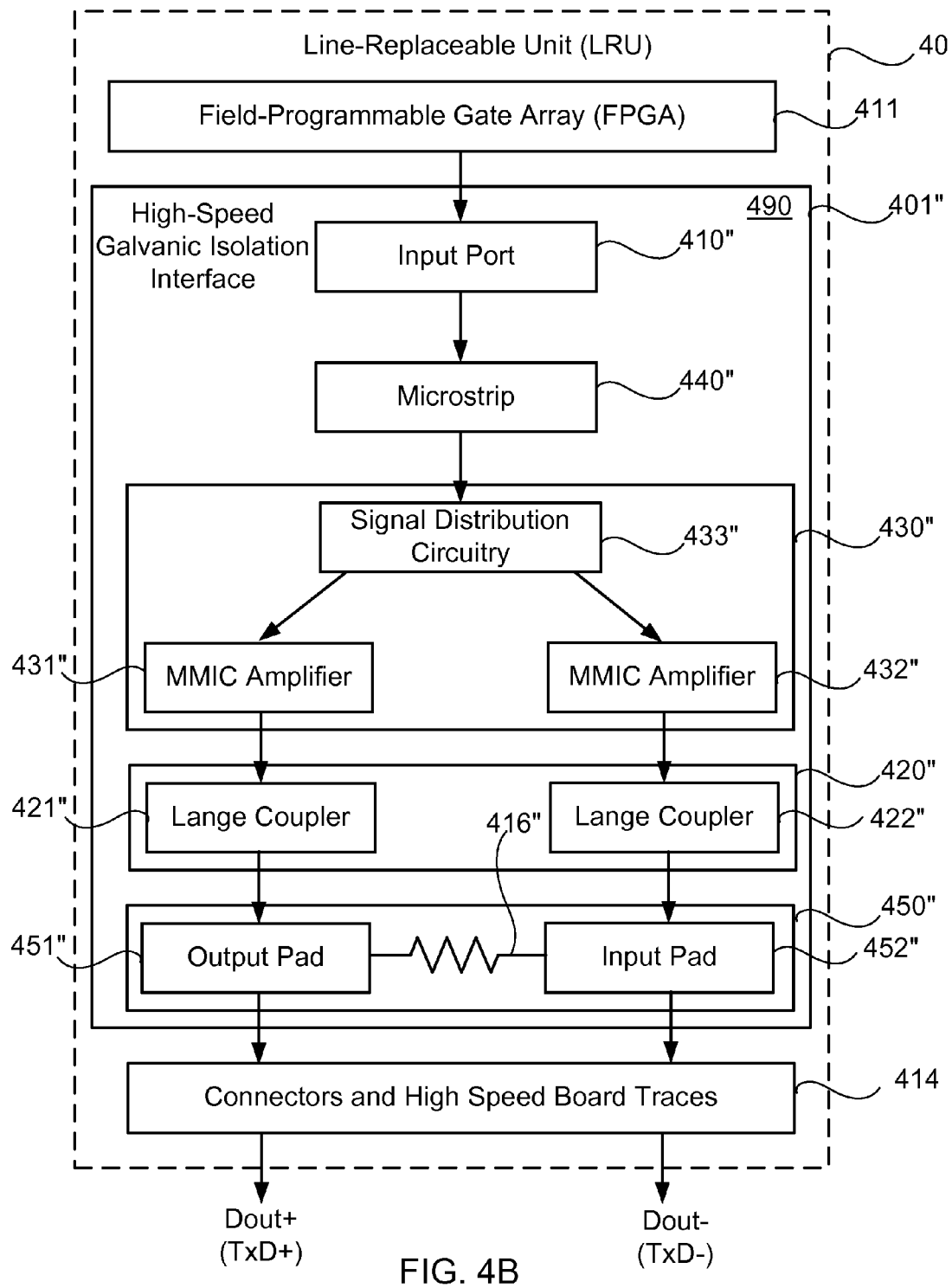
FIG. 4B illustrates a block diagram of an alternative high-speed galvanic isolation interface of the present invention configured to provide a pair of related signals from a first spacecraft electronic component to a second spacecraft electronic component, with the addition of signal distribution circuitry to further process the signals.

Additionally, as illustrated in FIG. 4B, LRU 40 of FIG. 4A also may include modified high-speed isolation interface 401". Modified high-speed isolation interface 401" may include output port 450", coupling structure 420", modified signal conditioner 430", modified microstrip structure 440", and modified input port 410", disposed on semi-insulating substrate 490 which may be the same substrate as that upon which interface 401' is disposed. FPGA 411 outputs a differentially combined Tx signal to output port 410". Output port 410" conveys the signal via microstrip structure 440" to signal conditioner 430". Modified signal conditioner 430" includes MMIC amplifiers 431", 432", as well as signal distribution circuitry 433". Signal distribution circuitry 433" is configured to receive the Tx signal from microstrip structure 440" and to differentially distribute the signals TxD+ and TxD− in proper phase relationship to meet the LVDS standard. Circuitry 433" outputs the differential TxD+ and TxD− signals to MMIC amplifiers 431", 432". Lange couplers 421", 422" of coupling structure 420" respectively receive the amplified signals from MMIC amplifiers 431", 432" and provide isolated amplified TxD+ and TxD− signals to output pads 451", 452" of output port 450". As in FIGS. 3A, 3B, and 4A, the impedance of the signaling may established to conform to the LVDS signaling scheme or modified to alternate impedances through the use of matching elements to improve signal integrity.

Interfaces 301', 301", 401', and 401" are illustrated as being unidirectional, which may be preferable for certain embodiment integration instances. Alternatively, a bi-directional implementation described below with reference to FIG. 5 includes a pair of interfaces in an alternative configuration such as shown in 301', 301", in which one of the interfaces provides unidirectional communication from a first electronic component, e.g., a first FPGA, to a second electronic component, e.g., to a second FPGA, and the other of the interfaces provides unidirectional communication in the opposite direction, e.g., from the second FPGA to the first FPGA.

Figure 5:
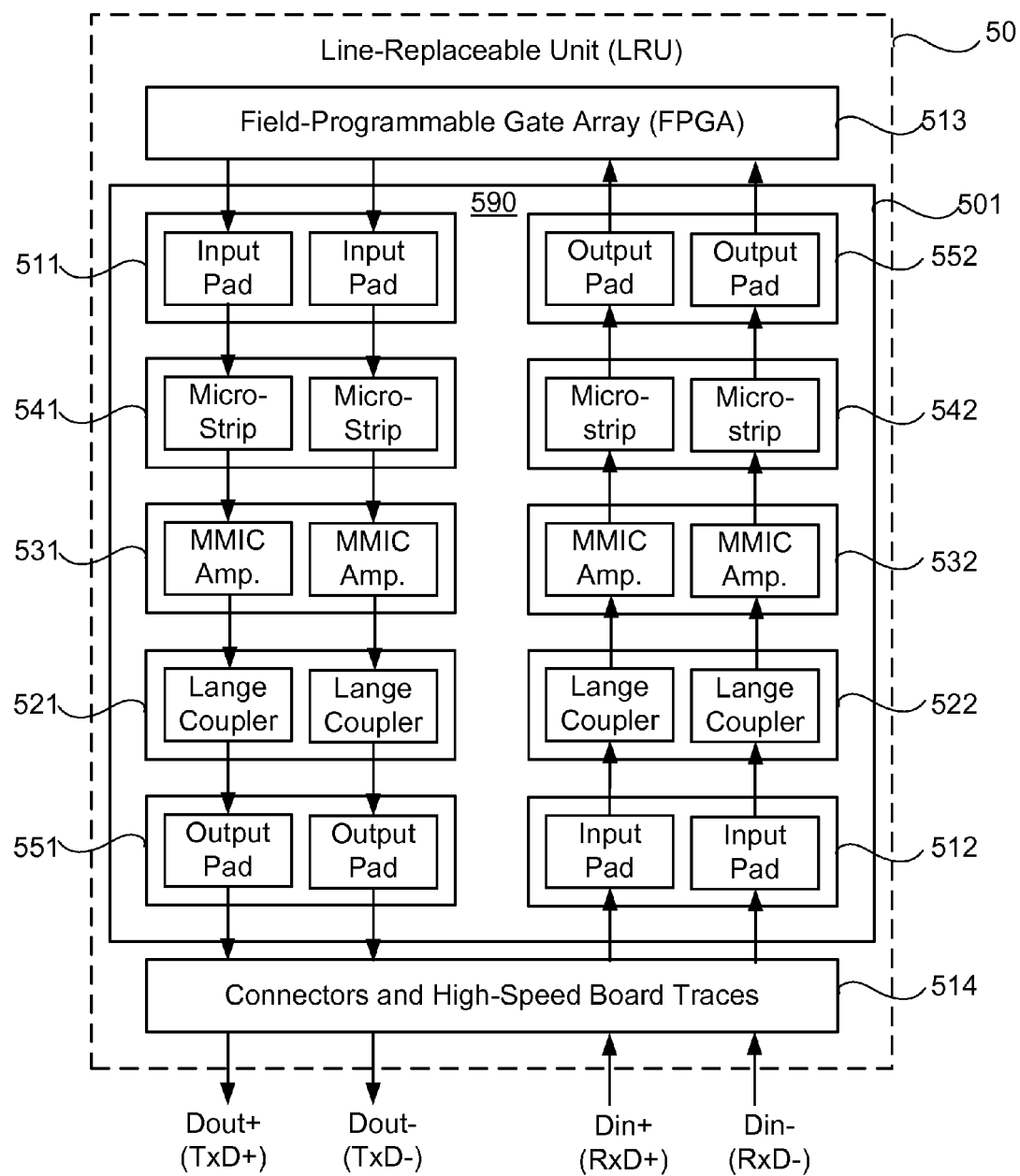
FIG. 5 illustrates a block diagram of one embodiment of a high-speed galvanic isolation interface of the present invention configured to provide and receive two pairs of related signals between a first spacecraft electronic component and a second spacecraft electronic component.

Specifically, FIG. 5 illustrates LRU 50 which includes alternative high-speed isolation interface 501, FPGA 513, and connectors and high-speed wiring 514. Alternative high-speed isolation interface 501 is configured to provide bi-directional communication between FPGA 513 and a second, external FPGA (not illustrated) for pairs of signals that are compliant with the SpaceWire and SpaceFibre standards. In bi-directional communication, the first pair of signals may be referred to as RxD+ and RxD−, while the second pair of signals may be referred to as TxD+ and TxD−. Interface 501 includes first input structure 511, first isolation structure 521, first signal conditioner 531, first microstrip structure 541, and first output structure 551, which are disposed on semi-insulating substrate 590 and respectively may be configured analogously to input structure 311', microstrip structure 340', signal conditioner 330', isolation structure 320', and output structure 350' described above with reference to FIG. 3A. That is, first input structure 511 may include a pair of input pads that are respectively configured to receive TxD+ and TxD− signals from the output of FPGA 513. First microstrip structure 541 may include a pair of microstrips configured to receive the two signals from the input pads 511 and to output those signals. First signal conditioner 531 may include first and second MMIC amplifiers respectively configured to receive the two signals from first microstrip structure 541 and output amplified signals. First isolation structure 521 may include a pair of Lange couplers respectively configured to receive the two signals from the first and second MMIC amplifiers 531 respectively and to output amplified isolated replicas of those signals. First output port 551 may be configured to receive the amplified isolated signals from the first isolation structure 521, and may include metallic pads which may be coupled by a resistive or other impedance element such as described above, and respectively configured to output the amplified isolated TxD+ and TxD− signals per the LVDS standard to connectors and high-speed board traces 514 and subsequently to an external electronic component, e.g., an FPGA in another LRU (not illustrated).

Interface 501 illustrated in FIG. 5 also includes second input structure 512, second isolation structure 522, second signal conditioner 532, second microstrip structure 542, and second output structure 552, which are configured to provide unidirectional signaling in the direction to that of elements 511, 521, 531, 541, and 551. That is, second input structure 512 may include a pair of input pads respectively configured to receive as input RxD+ and RxD− signals from an external electronic component, e.g., an FPGA in another LRU. Second isolation structure 522 may include a pair of Lange couplers respectively configured to receive the two signals from the input pads and to output isolated replicas of those signals. Second signal conditioner 532 may include first and second MMIC amplifiers respectively configured to receive the two isolated signals from the Lange couplers and to output amplified versions of those isolated signals. Second microstrip structure 542 may be configured to transmit the amplified isolated signals from the MMIC amplifiers to output port 552. Output port 552 may include a pair of output pads respectively configured to output the amplified isolated RxD+ and RxD− signals to the input of FPGA 513. Additionally, note that FPGA 513 suitably may be interchanged with other signal processing components, such as a complex programmable logic device (CPLD), a computer processing unit (CPU), a digital signal processor (DSP), or micro-controller unit (MCU) appropriate to the functionality implemented by the LRU's electronic architecture.

It should be understood that the arrangement illustrated in FIG. 5 may analogously be used with pairs of unidirectional interfaces having configurations other than those specifically illustrated in FIG. 5. For example, interface 201' illustrated in FIG. 2A and interface 201" illustrated in FIG. 2B may be used pairwise to provide unidirectional communication in both directions and achieve the bidirectional goal of the SpaceWire/Space Fibre standard. Or, for example, interface 401' illustrated in FIG. 4A and interface 401" illustrated in FIG. 4B may be used pairwise to provide bidirectional communication in a similar fashion. In this embodiment, in one direction interface 401' may separately receive RxD+ and RxD− and in the other direction interface 401" may separately transmit TxD+ and TxD−. Other configurations are possible, and following the LVDS and SpaceWire/SpaceFibre interface connectivity protocols allow different embodiments in various spacecraft electronic components.

Additionally, as is known to those familiar with SpaceWire and SpaceFibre, those standards provide for synchronous signal transmission between electronic components, in which both a data signal and a strobe (clock) signal are transmitted from one electronic component to another. The strobe signal may include a differential pair of signals analogous to RxD+/RxD− or TxD+/TxD−, and may be referred to as RxS+/RxS− or TxS+/TxS−. As such, in some embodiments compliant with SpaceWire and SpaceFibre, a single stream of information may be transmitted from one spacecraft electronic component to another using four related signals: RxD+, RxD−, RxS+, and RxS−, or, in the opposite direction, TxD+, TxD−, TxS+, and TxS−.

Figure 6A:
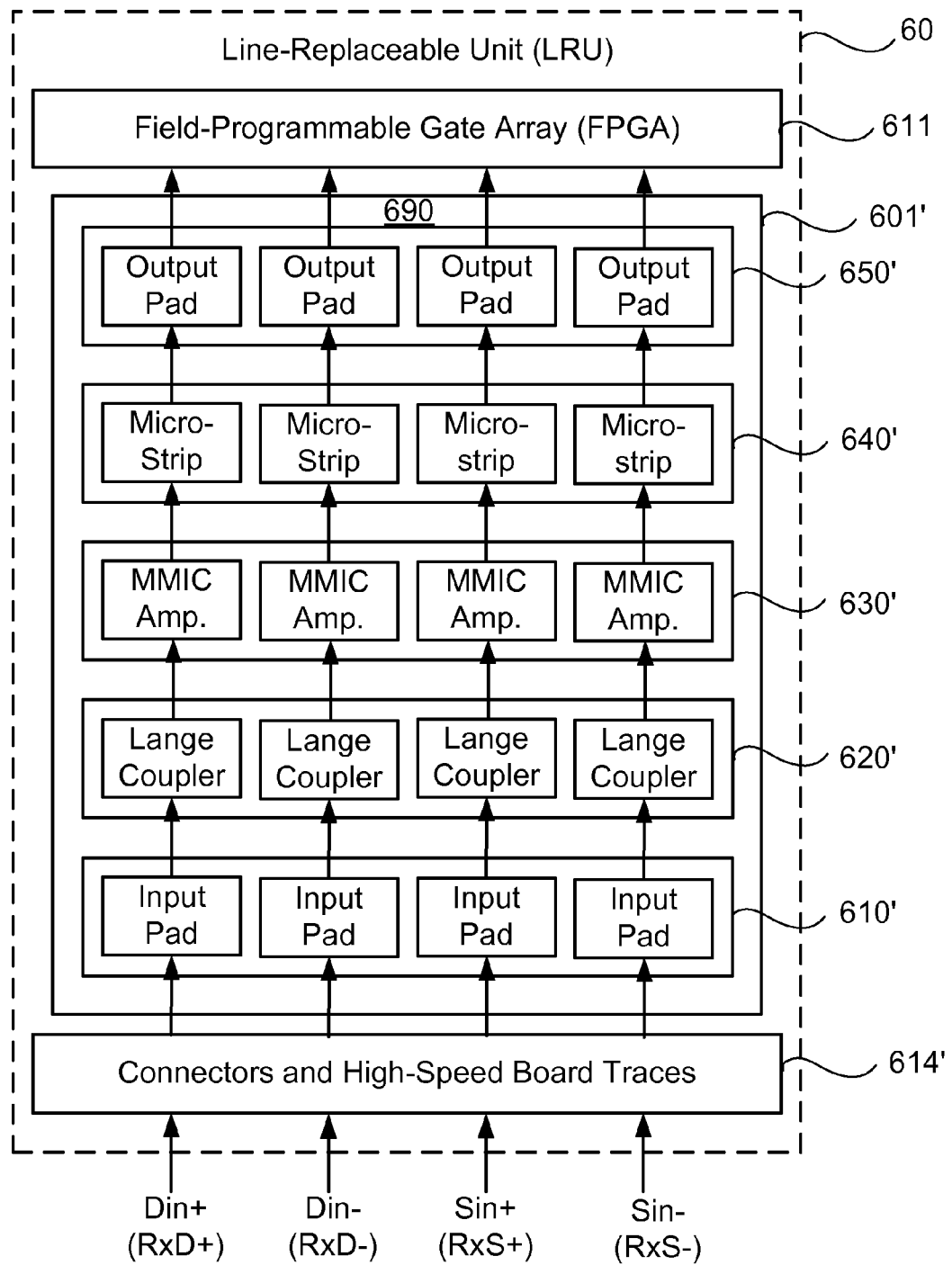
FIG. 6A illustrates a block diagram of an alternative embodiment of a high-speed galvanic isolation interface of the present invention configured to receive multiple pairs of related signals at a first spacecraft electronic component from a second spacecraft electronic component.

For example, FIG. 6A illustrates an embodiment configured to provide simultaneous unidirectional communication of four such related signals, e.g., RxD+, RxD−, RxS+, and RxS−, from a first spacecraft electronic component to a second spacecraft electronic component, e.g., from a first, externally connected FPGA in another LRU to a second, internal FPGA. Specifically, FIG. 6A illustrates LRU 60 which includes high-speed isolation interface 601', FPGA 611, and connectors and high-speed wiring 614'. Interface 601' includes an input port 610' having plurality of input pads, a coupling structure 620' having a plurality of Lange couplers, a conditioning structure 630' having a plurality of MMIC amplifiers, a microstrip structure 640' having a plurality of microstrip elements, and an output port 650' having a plurality of output pads are disposed on a single semi-insulating substrate 690, and are arranged so as to provide four parallel isolation interfaces respectively configured to process the four related signals. Specifically, input port 610', coupling structure 620', signal conditioner 630', microstrip structure 640', and output port 650' are configured to individually receive, isolate, condition (e.g., amplify), and output RxD+, RxD−, RxS+, and RxS+ in a manner analogous to that described above with reference to FIGS. 2B, 3A, 4A, and 5. The phase relationship among the four signals may be stable due to reproducible precision lithographic and modern process control of the signal conditioner active device parameters.

Figure 6B:
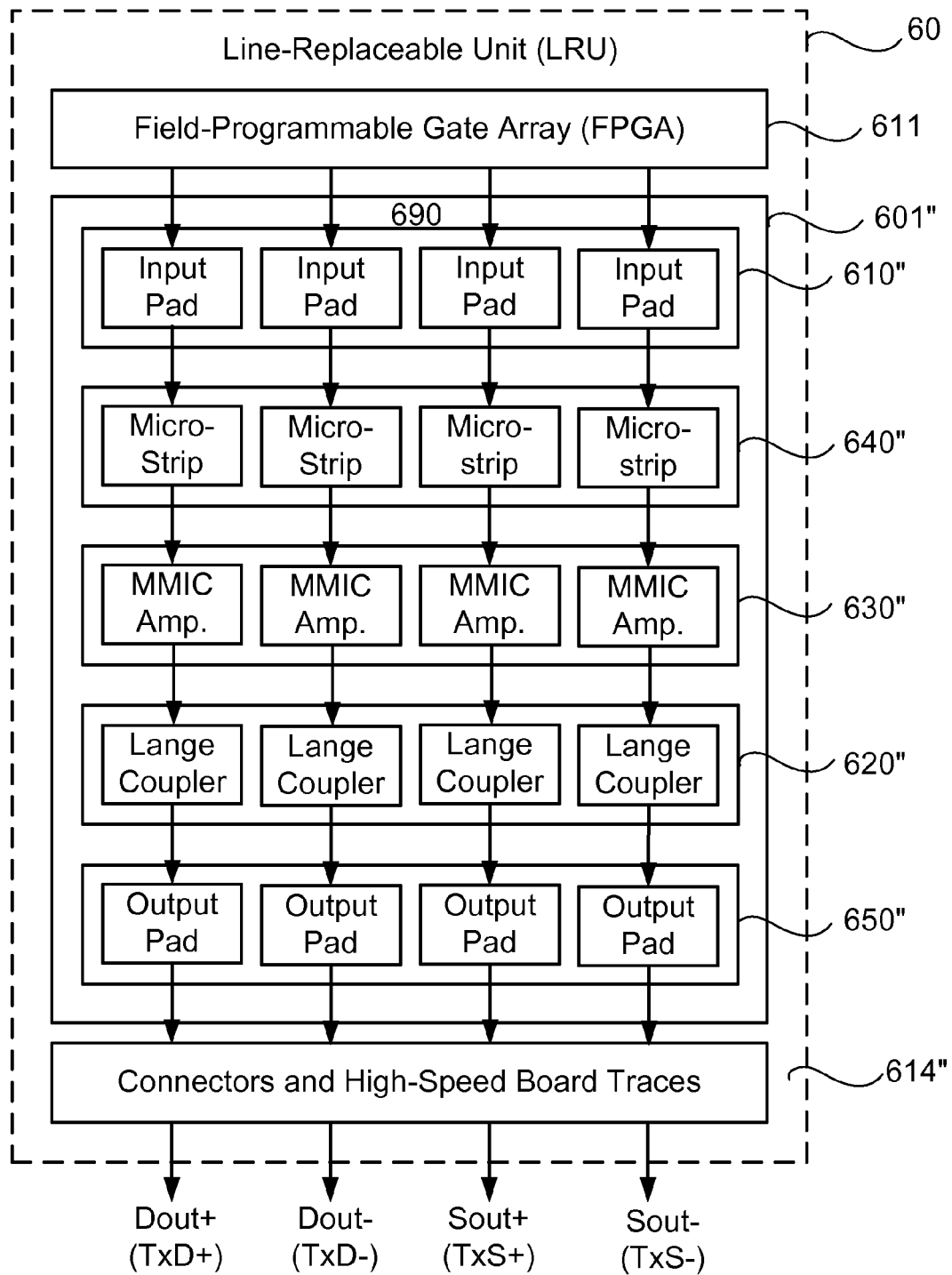
FIG. 6B illustrates a block diagram of an alternative embodiment of a high-speed galvanic isolation interface of the present invention configured to transmit multiple pairs of related signals from a first spacecraft electronic component to a second spacecraft electronic component.

Note that FIG. 6A illustrates unidirectional communication of four signals, e.g., RxD+, RxD−, RxS+, and RxS−, from one spacecraft electronic component to another. To provide bi-directional communication, another assembly of elements such as illustrated in FIG. 6B may be provided so as to provide unidirectional communication of another four signals, e.g., TxD+, TxD−, TxS+, and TxS−, in the opposite direction, in a manner analogous to that described above with reference to FIG. 5, where TxS+ and TxS− refer to the differential pair of strobe signals associated with TxD+ and TxD−. Specifically, FIG. 6B illustrates that LRU 60 further may include high-speed isolation interface 601" in which an input port 610" having plurality of input pads, a coupling structure 620" having a plurality of Lange couplers, a conditioning structure 630" having a plurality of MMIC amplifiers, a microstrip structure 640" having a plurality of microstrip elements, and an output port 650" having a plurality of output pads are disposed on a single semi-insulating substrate 690, and are arranged so as to provide four parallel isolation interfaces respectively configured to process the four related signals. Specifically, input port 610", coupling structure 620", signal conditioner 630", microstrip structure 640", and output port 650" are configured to individually receive, isolate, condition (e.g., amplify), and output TxD+, TxD−, TxS+, and TxS− in a manner analogous to that described above with reference to FIGS. 2C, 3B, 4B, and 5.

Additionally, interface 601' illustrated FIG. 6A and interface 601" illustrated in FIG. 6B optionally may include modified signal conditioning circuitry configured to differentially combine RxD+, RxD−, RxS+, and/or RxS+ (or alternatively, TxD+, TxD−, TxS+, and/or TxS−) with one another, in a manner analogous to that described above with reference to FIGS. 4A and 4B. For example, the modified signal conditioning circuitry may include a first structure configured to differentially combine RxD+ and RxD− with one another to provide a first differential combination, a second structure configured to differentially combine RxS+ and RxS− with one another to provide a second differential combination, and a third structure configured to differential combine the first and second differential combinations with one another to provide a third differential combination. Such differential signal combination may obviate the need to perform such differential signal combination on an FPGA, where it otherwise may be performed. One example of a design for signal combining circuitry that may be suitable to perform such a function is that of model no. UT200SpWPHY01 SpaceWire physical layer transceiver, manufactured by Aeroflex Colorado Springs, Inc. (Colorado Springs, Colo.). According to the manufacturer, the UT200SpWHY01 transceiver supports data rates up to 200 Mbits/second; as such, the transceiver supports a data throughput rate compatible with SpaceWire, but is not extensible to the higher frequencies. An implementation of a similar logical functional structure within a high speed technology such as GaAs MESFET technology on semi-insulating substrates may work in conjunction with the microstrip coupler that would provide galvanic isolation. Additionally, note that FPGA 611 suitably may be interchanged with other signal processing components, such as a complex programmable logic device (CPLD), a computer processing unit (CPU), a digital signal processor (DSP), or micro-controller unit (MCU) appropriate to the functionality implemented by the LRU's electronic architecture.

Figure 7:
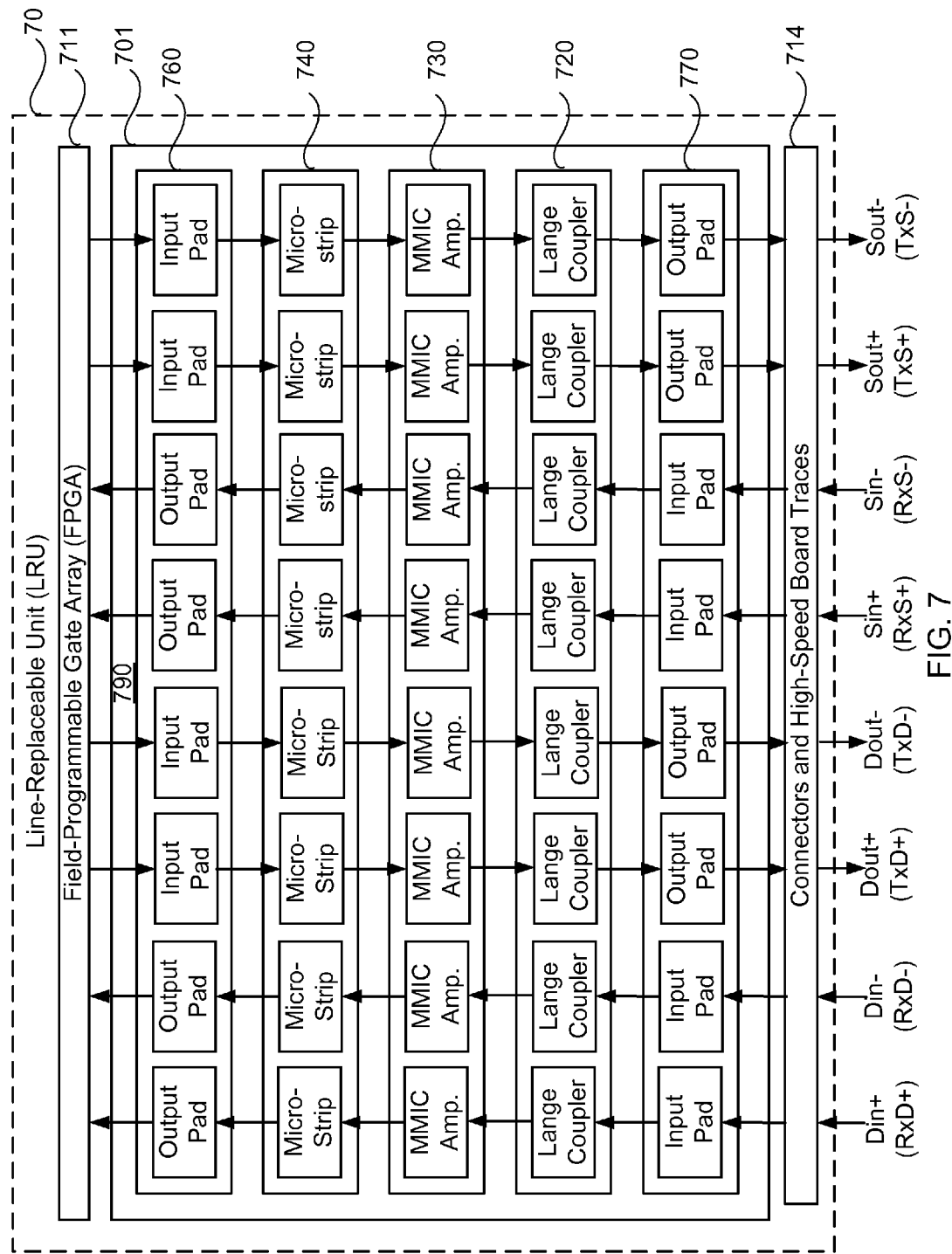
FIG. 7 illustrates a block diagram of an alternative embodiment of a high-speed galvanic isolation interface of the present invention configured to provide multiple pairs of related signals between a first spacecraft electronic component to a second spacecraft electronic component that provides a complete LVDS signaling scheme and is compatible with the SpaceWire/Fibre signaling protocol.

FIG. 7 illustrates the extension of the galvanic isolation interfaces of the present invention to a higher level of integration with multiple, bidirectional flows configured to implement LVDS functionality with extensions for the SpaceWire/Fibre for transmit and receive data and strobe signal as described in FIGS. 2B-6B. Specifically, LRU 70 illustrated in FIG. 7 includes FPGA 711, connectors and high-speed board traces 714, and high-speed isolation interface 701 disposed therebetween. Interface 701 includes input/output structure 760, microstrip structure 740, signal conditioner structure 730, coupling structure 720, and input/output structure 770. Input/output structure 760 includes a plurality of input pads and a plurality of output pads, and is coupled to FPGA 711 to receive signals therefrom and provide signals thereto. Microstrip structure 740 includes a plurality of microstrip elements that are respectively coupled to input or output pads of input/output structure 760. Signal conditioner structure 730 includes a plurality of MMIC amplifiers that are respectively coupled to microstrip elements of microstrip structure 740. Coupling structure 720 includes a plurality of Lange couplers that are respectively coupled to MMIC amplifiers of signal conditioner structure 730. The input or output pads of input/output structure 770 are respectively coupled to the Lange couplers of coupling structure 720. Preferably, the elements of interface 701 are disposed on a single semi-insulating substrate 790, and are arranged so as to provide eight parallel isolation interfaces respectively configured to process the eight related signals. Specifically, input/output structure 760, coupling structure 720, signal conditioning structure 730, microstrip structure 740, and input/output structure 770 are configured to individually receive, isolate, condition (e.g., amplify), and output TxD+, TxD−, TxS+, TxS−, RxD+, RxD−, and RxS+ in a manner analogous to that described above with reference to FIGS. 2B-6B. In an alternative embodiment, modified signal conditioners, microstrip structures, and output ports similar to those in FIGS. 4A-4B may be used to reduce the number of signals traversing the printed circuit board traces to the FPGA by incorporating additional signal processing within the isolation interface element. Additionally, note that FPGA 711 suitably may be interchanged with other signal processing components, such as a complex programmable logic device (CPLD), a computer processing unit (CPU), a digital signal processor (DSP), or micro-controller unit (MCU) appropriate to the functionality implemented by the LRU's electronic architecture.

Figure 8:
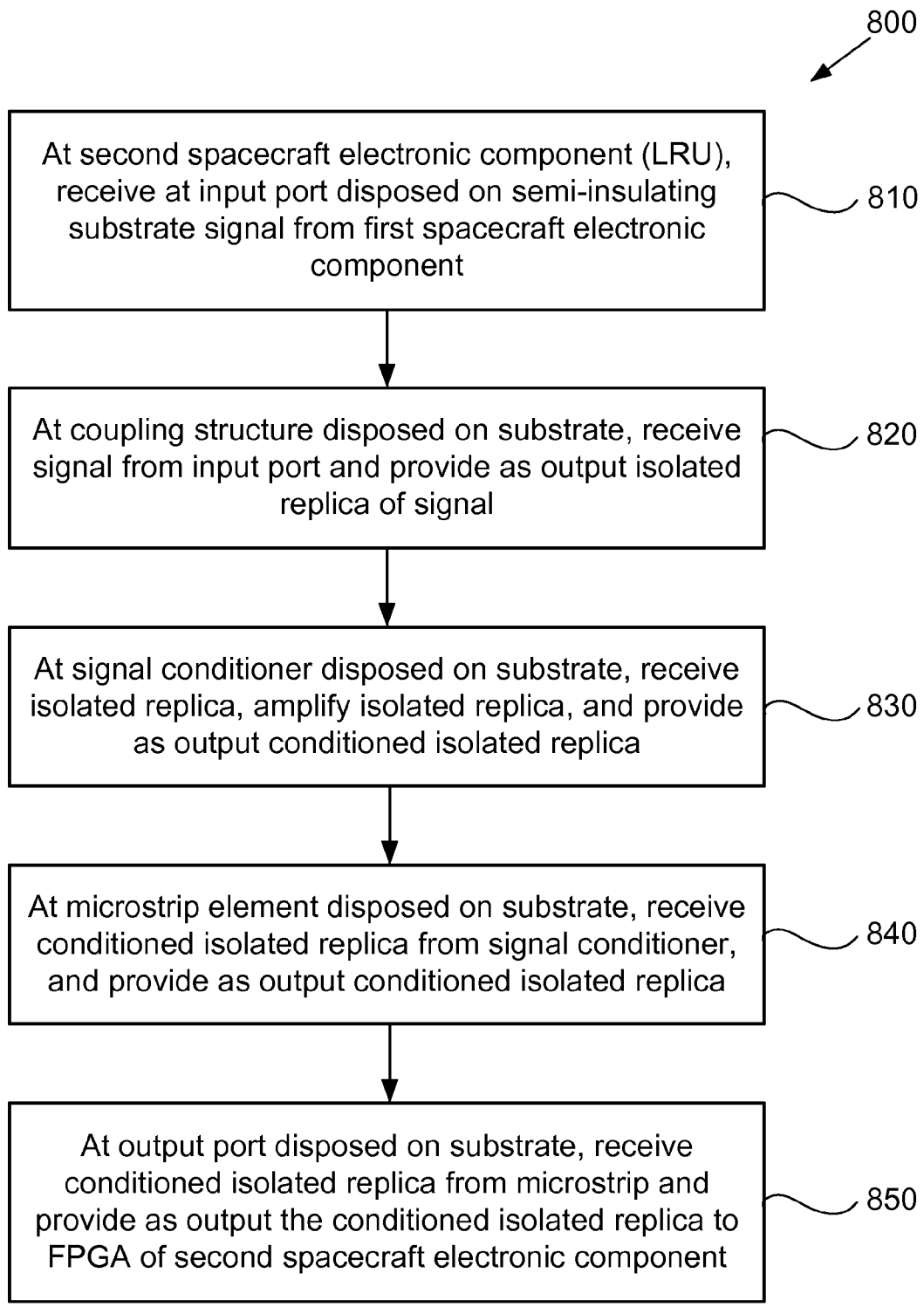
FIG. 8 illustrates steps in an exemplary method of using a high-speed galvanic isolation interface of the present invention to receive a signal at a first spacecraft electronic component from a second spacecraft electronic component.

FIG. 8 illustrates steps in an exemplary method 800 of receiving a signal transmitted from one spacecraft electronic component to another using a high-speed galvanic isolation interface of the present invention. Method 800 includes receiving at an input port disposed on a semi-insulating substrate of a second spacecraft electronic component (e.g., LRU) a signal from a first spacecraft electronic component (step 810). For example, input port 210' illustrated in FIG. 2B, input port 310' illustrated in FIG. 3A, or input port 410' illustrated in FIG. 4A may receive a signal from an external electronic component, e.g., another FPGA of another LRU. Depending on the particular configuration, the signal may be a data signal, e.g., RxD+, RxD−, or strobe (clock) signals, RxS+, RxS−, which also may be transmitted as differential pairs.

Then, a coupling structure disposed on the substrate receives the signal from the input port, and provides as output an isolated replica of the signal (step 820 of FIG. 8). For example, coupling structures 220', 320', or 420' respectively illustrated in FIGS. 2B, 3A, and 4A may receive as input the signal from the respective input port, and may include a Lange coupler that outputs an isolated replica of that signal.

Then, a signal conditioner disposed on the substrate receives the isolated replica from the coupling structure, conditions (e.g., amplifies) the isolated replica, and provides as output a conditioned isolated replica signal (step 830 of FIG. 8). For example, signal conditioners 230', 330', or 430' respectively illustrated in FIGS. 2B and 3A may receive as input the isolated replica, and may include a MMIC amplifier that outputs a conditioned (e.g., amplified) version of the isolated replica. In certain embodiments, e.g., interface 401' illustrated in FIG. 4A, the isolated replica also may be differentially combined with another signal being transmitted through the interface.

Then, a microstrip element disposed on the substrate receives the conditioned isolated replica from the signal conditioner, and provides as an output the signal (step 840 of FIG. 8) For example, microstrip structures 240', 340', or 440' respectively illustrated in FIGS. 2B, 3A, and 4A may receive as input the conditioned isolated replica and further condition the signal to maintain an optimal signal integrity, for example by modifying the impedance of the signal.

Then, an output port disposed on the substrate receives the conditioned isolated replica from the microstrip element, and provides the conditioned isolated replica as output to a second spacecraft electronic component (step 850 of FIG. 8). For example, output ports 250', 350', or 450' respectively illustrated in FIGS. 2B, 3A, and 4A may receive the conditioned isolated replica from the respective signal conditioner, and may provide that signal to the corresponding FPGA.

As noted above, the signal received using method 800 may be a data signal, e.g., RxD+, RxD−, or strobe (clock) signals (RxS+, RxS−), which also may be transmitted as differential pairs. It will be appreciated that method 800 may be repeated for each signal to be received using the high-speed galvanic isolation interface. For example, multiple simultaneous instances of method 800 may be used to simultaneously transmit RxD+, RxD−, and the pair of strobe signals RxS+, RxS+ corresponding to RxD+ and RxD− from one electronic component to another. The interface may be configured so as to provide a stable phase relationship among these four signals.

Figure 9:
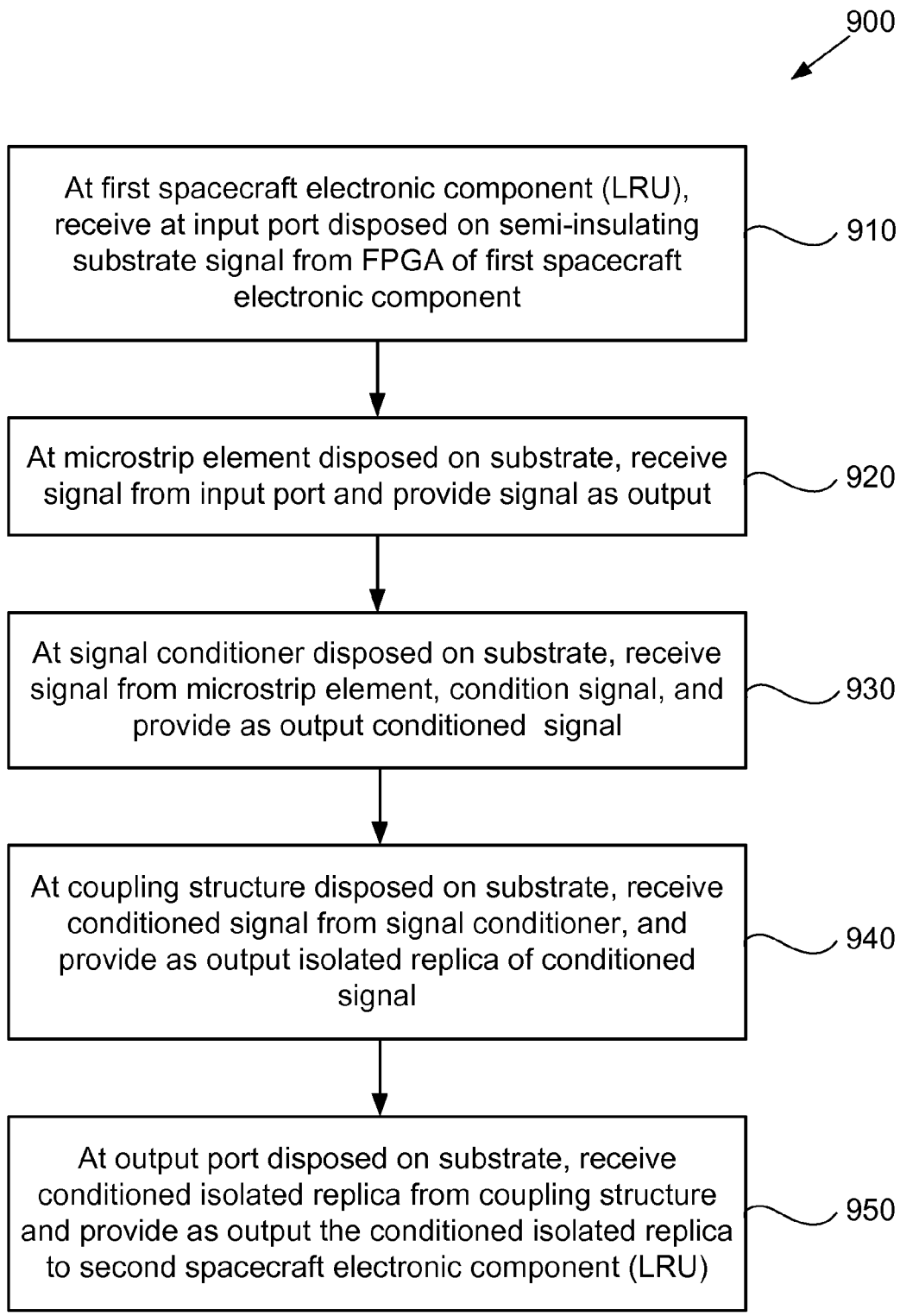
FIG. 9 illustrates steps in an exemplary method of using a high-speed galvanic isolation interface of the present invention to transmit a signal from a first spacecraft electronic component to a second spacecraft electronic component.

Additionally, a complementary method 900 as described in FIG. 9 may be used to simultaneously transmit one or more signals such as TxD+, TxD−, and the pair of strobe signals TxS+, TxS− corresponding to TxD+ and TxD− from one electronic component to another.

Specifically, FIG. 9 illustrates steps in an exemplary method 900 of transmitting a signal from one spacecraft electronic component to another using a high-speed galvanic isolation interface of the present invention. Method 900 includes receiving at an input port disposed on a semi-insulating substrate a signal from a signal source (e.g., FPGA) within a first spacecraft electronic component (e.g., LRU) (step 910). For example, input port 210", input port 310", or input port 410", respectively illustrated in FIGS. 2C, 3B, and 4B may receive a signal from the corresponding FPGA. Depending on the particular configuration, the signal may be a data signal, e.g., TxD+, TxD−, or strobe (clock) signals, TxS+, TxS−, which also may be transmitted as differential pairs, or a single transmit signal prior to differential signal processing as in FIG. 4B.

Then, a microstrip element disposed on the substrate receives the signal from the input port, and provides the signal as output (step 920 of FIG. 9), optionally adjusting the impedance of the signal so as to enhance signal integrity.

Then, a signal conditioner disposed on the substrate receives the signal from the microstrip, conditions (e.g., amplifies) the signal, and provides as output a conditioned signal (step 930 of FIG. 9). For example, signal conditioners 230", 330", or 430" respectively illustrated in FIGS. 2C, 3B, and 4B may receive the signal as input, and may include a MMIC amplifier that outputs an amplified version of the signal. In certain embodiments, e.g., interface 401" illustrated in FIG. 4B, the signal also may be differentially distributed by signal distribution circuitry 433", e.g., split into phase related inverse signals, before being amplified and transmitted to the conditioners. Optionally, a microstrip element, which may be integral to the signal conditioner or a separate element, provides the signal to the signal conditioner from the input port.

Then, a coupling structure disposed on the substrate receives the conditioned signal from the signal conditioner, and provides as output an isolated replica of the signal (step 940 of FIG. 9). For example, coupling structures 220", 320", or 420" respectively illustrated in FIGS. 2C, 3B, and 4B may receive as input the conditioned signal from the respective signal conditioner, and may include a Lange coupler that outputs an isolated replica of that conditioned signal. Note that in embodiments omitting the signal conditioner, step 930 above would be omitted and the coupling structure would instead receive the signal from the microstrip.

Then, an output port disposed on the substrate receives the conditioned isolated replica from the coupling structure, and provides the conditioned isolated replica as output to a second spacecraft electronic component (e.g., another LRU) (step 950 of FIG. 9). For example, output ports 250", 350" or 450" respectively illustrated in FIGS. 2C, 3B, and 4B may receive the conditioned isolated replica from the respective coupling structure, and may provide that signal to the second spacecraft electronic component.

As noted above, the signal transmitted using method 900 may be a data signal, e.g., TxD+, TxD−, or strobe (clock) signals (TxS+, TxS−), which also may be transmitted as differential pairs. It will be appreciated that method 900 may be repeated for each signal to be transmitted using the high-speed galvanic isolation interface. For example, multiple simultaneous instances of method 800 may be used to simultaneously transmit TxD+, TxD−, and the pair of strobe signals TxS+, TxS− corresponding to TxD+ and TxD− from one electronic component to another. The interface may be configured so as to provide a stable phase relationship among these four signals.

While various illustrative embodiments of the invention are described above, it will be apparent to one skilled in the art that various changes and modifications may be made therein without departing from the invention. For example, although the isolation interfaces and methods herein have been described primarily with respect to space electronics, it should be appreciated that the isolation interfaces and methods suitably may be modified for use in other environments, including but not limited to environments where the interfaces may be disposed to a sufficiently high level of electromagnetic interference and/or electrostatic discharge as would otherwise disrupt the performance of previously known silicon-based isolation interfaces. For example, the isolation interfaces and methods suitably may be adapted for use in manufacturing environments, for example where the turning of a motor may induce eddy currents in silicon-based isolation interfaces. Other devices also may benefit from the use of the galvanic isolation interfaces provided herein, such as medical devices requiring high data rates and galvanic isolation. The appended claims are intended to cover all such changes and modifications that fall within the true spirit and scope of the invention.

What is claimed:

1. A structure for providing isolated digital communication between first and second electronic components, the structure comprising:
    a semi-insulating substrate;
    a first input port disposed on the substrate and configured to receive a digital signal from the first electronic component;
    a first coupling structure disposed on the substrate, coupled to the first input port so as to receive the digital signal from the first input port, and configured to output an isolated digital replica of the received digital signal;
    a first digital signal conditioner disposed on the substrate, coupled to the first coupling structure so as to receive the isolated digital replica of the received digital signal from the first coupling structure, and configured to output a conditioned isolated digital replica;
    a first microstrip element disposed on the substrate, coupled to the first digital signal conditioner so as to receive the conditioned isolated digital replica from the first signal conditioner, and configured to output the conditioned isolated digital replica;
    a first output port disposed on the substrate, coupled to the first microstrip element so as to receive the conditioned isolated digital replica from the first microstrip element, and configured to provide the conditioned isolated digital replica to the second electronic component.

2. The structure of claim 1, wherein the digital signal comprises first and second digital signals that are substantially complementary to one another,
    wherein the first input port comprises first and second input pads respectively configured to receive the first and second digital signals,
    wherein the first coupling structure comprises first and second Lange couplers respectively coupled to the first and second input pads so as to receive the first and second digital signals from the first or second input pad and each configured to respectively output an isolated replica of the first or second digital signal;
    wherein the first digital signal conditioner comprises first and second monolithic microwave integrated circuit (MMIC) digital amplifiers respectively coupled to the first and second Lange couplers so as to respectively receive the isolated digital replica of the first or second digital signal from the first or second Lange coupler, and respectively configured to amplify the isolated digital replica;
    wherein the first microstrip element comprises first and second microstrips that are respectively electrically connected to the first and second MMIC digital amplifiers so as to receive the first and second digital signals from the first or second MMIC digital amplifier and to respectively output the isolated amplified digital replica of the first or second digital signal, one or more characteristics of the isolated amplified digital replicas of the first and second digital signals being stable relative to one another; and
    wherein the first output port comprises first and second output pads respectively coupled to the first and second microstrips, and respectively configured to provide the first and second amplified isolated digital replicas to the second electronic component.

3. The structure of claim 2, wherein the first and second electronic components each include an electronic digital processing component independently selected from the group consisting of field-programmable gate array (FPGA), complex programmable logic device (CPLD), computer processing unit (CPU), digital signal processor (DSP), and microcontroller unit (MCU).

4. The structure of claim 1, further comprising:
    a second input port disposed on the substrate and configured to receive a digital signal from the second electronic component;
    a second coupling structure disposed on the substrate, coupled to the second input port so as to receive the digital signal from the second input port, and configured to output an isolated digital replica of the received digital signal;
    a second digital signal conditioner disposed on the substrate, coupled to the second coupling structure so as to receive the isolated digital signal replica from the second coupling structure, and configured to output a conditioned isolated digital replica;
    a second microstrip element disposed on the substrate, coupled to the digital second signal conditioner so as to receive the conditioned isolated digital replica from the second digital signal conditioner and configured to output the conditioned isolated digital replica; and
    a second output port disposed on the substrate, coupled to the second microstrip element so as to receive the conditioned isolated digital replica from the second microstrip element, and configured to provide the conditioned isolated digital replica to the first electronic component.

5. The structure of claim 4, wherein the first and second input ports each comprise a pair of input pads,
    wherein the first and second coupling structures each comprise a pair of Lange couplers, wherein the first and second digital signal conditioners each comprise a pair of monolithic microwave integrated circuit (MMIC) digital amplifiers, wherein the first and second microstrip elements each comprise a pair of microstrips; and wherein the first and second output ports each comprise a pair of output pads.

6. The structure of claim 4, wherein the respective digital signals from the first and second electronic components each comply with a SpaceWire or SpaceFibre signal protocol, and wherein the conditioned isolated digital replicas respectively provided to the first and second electronic components each comply with the SpaceWire or SpaceFibre signal protocol.

7. The structure of claim 6, further comprising:

a third input port disposed on the substrate and configured to receive a digital strobe signal from the first electronic component, the digital strobe signal complying with the SpaceWire or SpaceFibre signal protocol;

a third coupling structure disposed on the substrate, coupled to the third input port so as to receive the digital strobe signal from the third input port, and configured to output an isolated replica of the digital strobe signal;

a third digital signal conditioner disposed on the substrate, coupled to the third coupling structure so as to receive the isolated replica of the digital strobe signal from the third coupling structure, and configured to output a conditioned isolated digital replica;

a third microstrip element disposed on the substrate, coupled to the third digital signal conditioner so as to receive the conditioned isolated digital replica from the third digital signal conditioner and configured to output the conditioned isolated digital replica;

a third output port disposed on the substrate, coupled to the third microstrip element so as to receive the conditioned isolated digital replica from the third microstrip element, and configured to provide the conditioned isolated digital replica to the second electronic component;

a fourth input port disposed on the substrate and configured to receive a digital strobe signal from the first electronic component, the digital strobe signal complying with the SpaceWire or SpaceFibre signal protocol;

a fourth coupling structure disposed on the substrate, coupled to the fourth input port so as to receive the digital strobe signal from the fourth input port, and configured to output an isolated digital replica of the digital strobe signal;

a fourth digital signal conditioner disposed on the substrate, coupled to the fourth coupling structure so as to receive the isolated digital replica of the digital strobe signal from the fourth coupling structure, and configured to output a conditioned isolated digital replica;

a fourth microstrip element disposed on the substrate, coupled to the fourth digital signal conditioner so as to receive the conditioned isolated digital replica from the fourth digital signal conditioner and configured to output the conditioned isolated digital replica; and a fourth output port disposed on the substrate, coupled to the fourth microstrip element so as to receive the conditioned isolated digital replica from the fourth microstrip element, and configured to provide the conditioned isolated digital replica to the second electronic component.

8. The structure of claim 1, wherein the semi-insulating substrate comprises a material selected from the group consisting of: gallium arsenide (GaAs), gallium nitride (GaN), silicon carbide (SiC), silicon-on-sapphire (SOS), and silicon-on-insulator (SOI).

9. The structure of claim 8, wherein the first coupling structure is lithographically defined and comprises a metal pair of elements to transfer the digital signal from the first input port to the first digital signal conditioner without forming an electrical path.

10. The structure of claim 9, wherein the first input port, the first digital signal conditioner, the first microstrip element, and the first output port are lithographically defined.

11. A structure for providing isolated digital communication between first and second electronic components, the structure comprising:

a semi-insulating substrate;

a first input port disposed on the substrate and configured to receive a digital signal from a digital signal processing element within the first electronic component;

a first microstrip element disposed on the substrate, coupled to the first input port so as to receive the digital signal from the first input port and configured to output the received digital signal;

a first digital signal conditioner disposed on the substrate, coupled to the first microstrip element so as to receive the digital signal from the first microstrip element, and configured to output a conditioned digital signal;

a first coupling structure disposed on the substrate, coupled to the first digital signal conditioner so as to receive the conditioned digital signal from the first digital signal conditioner, and configured to output a conditioned isolated digital replica; and a first output port disposed on the substrate, coupled to the first coupling structure so as to receive the conditioned isolated digital replica from the first coupling structure, and configured to provide the conditioned isolated digital replica to the second electronic component.

12. The structure of claim 11, wherein the digital signal comprises first and second digital signals that are substantially complementary to one another, wherein the first input port comprises first and second input pads respectively configured to receive the first and second digital signals, wherein the first microstrip element comprises first and second microstrips that are respectively electrically connected to the first and second input pads so as to receive the first and second digital signals from the input pads and to respectively output the first and second digital signals with one or more characteristics that are stable relative to one another, wherein the first digital signal conditioner comprises first and second monolithic microwave integrated circuit (MMIC) digital amplifiers respectively coupled to the first and second microstrip elements so as to respectively receive the first and second digital signals from the first and second microstrips, and respectively configured to output amplified first and second digital signals;

wherein the first coupling structure comprises first and second Lange couplers respectively coupled to the first and second MMIC digital amplifiers so as to receive the amplified first and second digital signals and each configured to respectively output isolated replicas of the amplified first and second digital signals; and wherein the first output port comprises first and second output pads respectively coupled to the first and second Lange couplers, and respectively configured to provide the first and second amplified isolated digital replicas to the second electronic component.

13. The structure of claim 12, wherein the first and second electronic components include an electronic digital processing component independently selected from the group consisting of field-programmable gate array (FPGA), complex programmable logic device (CPLD), computer processing unit (CPU), digital signal processor (DSP), and micro-controller unit (MCU).

14. The structure of claim 11, further comprising:
a second input port disposed on the substrate and configured to receive a digital signal from the second electronic component;
a second microstrip element disposed on the substrate, coupled to the second input port so as to receive the digital signal from the second input port and configured to output the received digital signal;
a second digital signal conditioner disposed on the substrate, coupled to the second microstrip element so as to receive the digital signal from the first microstrip element, and configured to output a conditioned digital signal;
a second coupling structure disposed on the substrate, coupled to the second digital signal conditioner so as to receive the conditioned digital signal from the second signal conditioner, and configured to output a conditioned isolated digital replica; and
a second output port disposed on the substrate, coupled to the second coupling structure so as to receive the conditioned isolated digital replica from the second coupling structure, and configured to provide the conditioned isolated digital replica to the first electronic component.

15. The structure of claim 14,
wherein the first and second input ports each comprise a pair of input pads,
wherein the first and second coupling structures each comprise a pair of Lange couplers,
wherein the first and second microstrip elements each comprise a pair of microstrips configured to maintain one or more stable characteristics of the conditioned isolated digital replicas of the first and second digital signals relative to one another,
wherein the first and second digital signal conditioners each comprise a pair of monolithic microwave integrated circuit (MMIC) digital amplifiers, and
wherein the first and second output ports each comprise a pair of output pads.

16. The structure of claim 14, wherein the respective digital signals from the first and second electronic components each comply with a SpaceWire or SpaceFibre signal protocol, and wherein the conditioned isolated digital replicas respectively provided to the first and second electronic components each comply with the SpaceWire or SpaceFibre signal protocol.

17. The structure of claim 16, further comprising:
a third input port disposed on the substrate and configured to receive a digital strobe signal from the digital signal processing component, the digital strobe signal complying with the SpaceWire or SpaceFibre signal protocol;
a third microstrip element disposed on the substrate, coupled to the third input port so as to receive the digital strobe signal from the third input port and configured to output the received digital strobe signal;
a third digital signal conditioner disposed on the substrate, coupled to the third microstrip element so as to receive the digital strobe signal from the third microstrip element, and configured to output a conditioned digital strobe signal;
a third coupling structure disposed on the substrate, coupled to the third digital signal conditioner so as to receive the conditioned digital strobe signal from the third digital signal conditioner, and configured to output a conditioned isolated digital replica;

a third output port disposed on the substrate, coupled to the third coupling structure so as to receive the conditioned isolated digital replica from the third coupling structure, and configured to provide the conditioned isolated digital replica to the second electronic component;
a fourth input port disposed on the substrate and configured to receive a digital strobe signal from the digital signal processing component, the digital strobe signal complying with the SpaceWire or SpaceFibre signal protocol;
a fourth microstrip element disposed on the substrate, coupled to the fourth input port so as to receive the digital strobe signal from the fourth input port and configured to output the received digital strobe signal;
a fourth digital signal conditioner disposed on the substrate, coupled to the fourth microstrip element so as to receive the digital strobe signal from the fourth microstrip element, and configured to output a conditioned digital strobe signal;
a fourth coupling structure disposed on the substrate, coupled to the fourth digital signal conditioner so as to receive the conditioned digital strobe signal from the fourth digital signal conditioner, and configured to output a conditioned isolated digital replica; and
a fourth output port disposed on the substrate, coupled to the fourth coupling structure so as to receive the conditioned isolated digital replica from the fourth coupling structure, and configured to provide the conditioned isolated digital replica to the second electronic component.

18. The structure of claim 11, wherein the semi-insulating substrate comprises a material selected from the group consisting of: gallium arsenide (GaAs), gallium nitride (GaN), silicon carbide (SiC), silicon-on-sapphire (SOS), and silicon-on-insulator (SOI).

19. The structure of claim 18, wherein the first coupling structure is lithographically defined and comprises a metal pair of elements configured to transfer the signal from the first signal conditioner to the first output port without forming an electrical path.

20. The structure of claim 19, wherein the first input port, the first digital signal conditioner, the first microstrip element, and the first output port are lithographically defined.

21. A method for providing isolated digital communication between first and second electronic components, the method comprising:
receiving at a first input port disposed on a semi-insulating substrate in the second electronic component a digital signal from the first electronic component;
at a first coupling structure disposed on the substrate, receiving the digital signal from the first input port and providing as output an isolated digital replica of the received digital signal;
at a first digital signal conditioner disposed on the substrate, receiving the isolated digital replica from the first coupling structure, conditioning the isolated digital replica, and providing as output a conditioned isolated digital replica;
at a first microstrip element disposed on the substrate, receiving the conditioned isolated digital replica from the first digital signal conditioner, and providing as output the conditioned isolated digital replica, and
at a first output port disposed on the substrate, receiving the conditioned isolated digital replica from the first microstrip element and providing as output the conditioned isolated digital replica to the second electronic component.

22. The method of claim 21, wherein the digital signal comprises first and second digital signals that are substantially complementary to one another,
- wherein the first input port comprises first and second input pads respectively receiving the first and second digital signals,
- wherein the first coupling structure comprises first and second Lange couplers respectively receiving the first and second digital signals from the first and second input pads and respectively providing as output isolated digital replicas of the first or second digital signal;
- wherein the first digital signal conditioner comprises first and second monolithic microwave integrated circuit (MMIC) digital amplifiers respectively receiving the isolated digital replicas of the first and second digital signals from the first and second Lange couplers and respectively providing as output first and second conditioned isolated digital replicas;
- wherein the first microstrip element comprises first and second microstrips respectively receiving the first and second conditioned isolated digital replicas from the MMIC amplifiers and respectively outputting the conditioned isolated digital replica, one or more characteristics of the first and second conditioned isolated digital replicas being stable relative to one another; and
- wherein the first output port comprises first and second output pads respectively receiving the first and second conditioned isolated digital replicas from the first and second microstrips and respectively providing the first and second conditioned isolated digital replicas to the second electronic component.

23. The method of claim 22, wherein the first and second electronic components include an electronic digital processing component independently selected from the group consisting of field-programmable gate array (FPGA), complex programmable logic device (CPLD), computer processing unit (CPU), digital signal processor (DSP), and micro-controller unit (MCU).

24. The method of claim 21, further comprising:
- receiving at a second input port disposed on the substrate a second digital signal from the second electronic component;
- at a second coupling structure disposed on the substrate, receiving the second digital signal from the second input port and providing as output an isolated replica of the second digital signal;
- at a second digital signal conditioner disposed on the substrate, receiving the second digital signal from the second input port, conditioning the second digital signal, and providing as output a second conditioned isolated digital replica;
- at a second microstrip element disposed on the substrate, receiving the second conditioned isolated digital replica from the second digital signal conditioner, and providing as output the second conditioned isolated digital replica; and
- at a second output port disposed on the substrate, receiving the second conditioned isolated digital replica from the second microstrip element and providing as output the second conditioned isolated digital replica to the first electronic component.

25. The method of claim 24, wherein the first and second input ports each comprise a pair of input pads,
- wherein the first and second coupling structures each comprise a pair of Lange couplers,
- wherein the first and second digital signal conditioners each comprise a pair of monolithic microwave integrated circuit (MMIC) digital amplifiers,
- wherein the first and second microstrip elements each comprise a pair of microstrips, and
- wherein the first and second output ports each comprise a pair of output pads.

26. The method of claim 24, wherein the respective digital signals from the first and second electronic components each comply with a SpaceWire or SpaceFibre signal protocol, and wherein the conditioned isolated digital replicas respectively provided to the first and second electronic component each comply with the SpaceWire or SpaceFibre signal protocol.

27. The method of claim 26, further comprising:
- receiving at a third input port disposed on the substrate a digital strobe signal from the first electronic component, the digital strobe signal complying with the SpaceWire or SpaceFibre signal protocol;
- at a third coupling structure disposed on the substrate, receiving the digital strobe signal from the third input port and providing as output an isolated digital replica of the digital strobe signal;
- at a third digital signal conditioner disposed on the substrate, receiving the isolated digital replica of the digital strobe signal from the third coupling structure, conditioning the isolated digital replica of the digital strobe signal, and providing as output a conditioned isolated digital replica of the digital strobe signal;
- at a third microstrip element disposed on the substrate, receiving the conditioned isolated digital replica from the third digital signal conditioner, and providing as output the conditioned isolated digital replica;
- at a third output port disposed on the substrate, receiving the conditioned isolated digital replica of the digital strobe signal from the third microstrip element and providing as output the conditioned isolated digital replica of the digital strobe signal to the second electronic component;
- receiving at a fourth input port disposed on the substrate a digital strobe signal from the first electronic component, the digital strobe signal complying with the SpaceWire or SpaceFibre signal protocol;
- at a fourth coupling structure disposed on the substrate, receiving the digital strobe signal from the fourth input port and providing as output an isolated digital replica of the digital strobe signal;
- at a fourth digital signal conditioner disposed on the substrate, receiving the isolated digital replica of the digital strobe signal from the fourth coupling structure, conditioning the isolated digital replica of the digital strobe signal, and providing as output a conditioned isolated digital replica of the digital strobe signal;
- at a fourth microstrip element disposed on the substrate, receiving the conditioned isolated digital replica from the fourth digital signal conditioner, and providing as output the conditioned isolated digital replica; and
- at a fourth output port disposed on the substrate, receiving the conditioned isolated digital replica of the digital strobe signal from the fourth microstrip element and providing as output the conditioned isolated digital replica of the digital strobe signal to the second electronic component.

28. The method of claim 21, wherein the semi-insulating substrate comprises a material selected from the group consisting of: gallium arsenide (GaAs), gallium nitride (GaN), silicon carbide (SiC), silicon-on-sapphire (SOS), and silicon-on-insulator (SOI).

29. The method of claim 28, comprising lithographically defining the first coupling structure, the lithographically defined first coupling structure comprising a metal pair of elements to transfer the digital signal from the first input port to the first digital signal conditioner without forming an electrical path.

30. The method of claim 29, further comprising lithographically defining the first input port, the first digital signal conditioner, the first microstrip element, and the first output port.

* * * * *